United States Patent
Haridas

(10) Patent No.: US 6,592,751 B2
(45) Date of Patent: Jul. 15, 2003

(54) DEVICE FOR TREATMENT OF WASTEWATER

(75) Inventor: Ajit Haridas, Kerala (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 09/962,440

(22) Filed: Sep. 26, 2001

(65) Prior Publication Data

US 2003/0057152 A1 Mar. 27, 2003

(51) Int. Cl.$^7$ .................................................. C02F 3/28
(52) U.S. Cl. ...................... 210/97; 210/120; 210/150; 210/205; 210/260; 210/603; 210/617
(58) Field of Search ................. 210/603, 605, 210/614–618, 621, 629, 630, 86, 97, 104, 120, 150, 151, 205, 220, 259, 260

(56) References Cited

U.S. PATENT DOCUMENTS

| | | | | |
|---|---|---|---|---|
| 2,335,562 A | * | 11/1943 | Downes | 210/120 |
| 4,182,675 A | * | 1/1980 | Jeris | 210/612 |
| 4,532,042 A | * | 7/1985 | Aivasidis et al. | 210/603 |
| 4,613,434 A | | 9/1986 | Määttä | |
| 4,746,433 A | * | 5/1988 | Nobl et al. | 210/603 |
| 5,080,793 A | * | 1/1992 | Urlings | 210/603 |
| 5,180,494 A | * | 1/1993 | Yamaguchi et al. | 210/603 |
| 5,232,586 A | | 8/1993 | Malone | |
| 5,690,824 A | | 11/1997 | Stuth | |
| 5,770,080 A | | 6/1998 | Malone | |
| 5,958,238 A | * | 9/1999 | Langerwerf | 210/603 |
| 6,177,004 B1 | | 1/2001 | Bracone, Jr. | |

OTHER PUBLICATIONS

International Search Report (Form PCT/ISA/210), Oct. 23, 2001, for PCT/IN01/00192, 4 pages.
Patent Cooperation Treaty (Form PCT/ISA/220), Oct. 23, 2001, for PCT/IN01/00192, 3 pages.

* cited by examiner

*Primary Examiner*—Fred Prince
(74) *Attorney, Agent, or Firm*—Burns, Doane, Swecker & Mathis, L.L.P.

(57) ABSTRACT

A high-rate reactor system, (applying a high superficial velocity), capable of treating partially soluble, complex, high-strength wastewater. The reactor system is configured in multiple stages and has the ability to retain complex insoluble substrates in a wide range of particle sizes in spatially separate stages for sufficient residence time to enable complete degradation. A vertically oriented vessel has neighboring upper and lower chambers, each chamber having a gas retention space and a liquid retention space. A filter chamber has an inlet communicating with the liquid retention space of the lower chamber and an outlet communicating with the liquid retention space of the upper chamber. A gas conduit communicates the gas retention space of the lower chamber with the gas retention space of the upper chamber. A discharge device enables gas to be periodically discharged from the lower chamber to the upper chamber through the gas conduit.

32 Claims, 14 Drawing Sheets

DEVICE FOR TREATMENT OF WASTEWATER

FIELD OF THE INVENTION

The present invention relates to a device for treatment of wastewater. More particularly, the present invention relates to a device for the removal of biodegradable contaminants from wastewater using biological processes. The present invention also relates to a system for purifying highly contaminated water which contains a large amount of suspended solid impurities (TSS) and high concentrations of BOD (biochemical oxygen demand) and COD (chemical oxygen demand) as, for example, effluents from food processing plants and toilets. The device enables the efficient removal of biodegradable solid substances from wastewater by a combination of filtration and biochemical reaction. In other words, this invention relates to a bioreactor device that enables both biological degradation and the filtration of suspended solids.

BACKGROUND OF THE INVENTION

The treatment of wastewater for the removal of substances that cause BOD is best accomplished by biological treatment methods such as aerobic degradation and anaerobic degradation. There is a wide range of industrial operations that result in liquid effluents containing substantial amounts PBOD, which has to be removed to conform to national discharge regulations. In addition, several of these high-BOD industrial effluents, have substantial quantities of BOD present as suspended solid material.

In general, examples of BOD exerting suspended solids include, but are not limited to, partially dissolved and partially macromolecular materials, such as proteins, long-chain fatty acids, fats, vegetable oils, tallow, bacterial and yeast cell-walls, celluloses, hemicelluloses, and starch; the suspended solids being present in emulsified, suspended or colloidal state. Effluents of this nature are discharged for example, from slaughterhouses, dairies, rendering plants, oil mills, pharmaceutical and organochemical plants, pulp and paper factories.

The relevant organic compounds constituting biodegradable solid organic matter are generally classified as 1) Polysaccharides common among which are cellulose, hemicellulose, starch and pectin 2) Proteins and amino acids which are present as insoluble matter when coagulated by heat, acids or tannins and 3) Fats and long chain fatty acids. All these compounds can be degraded by anaerobic microorganisms to form methane. The first step in the degradation process is called solubilization which results in the formation of soluble compounds and is carried out by enzyme action outside of the microbial cell. This is a slow process and requires sufficient microbial cells producing the enzymes and sufficient contacting time between enzyme and solids. In fact, the solubilization step is most often the rate limiting step in the sequence of anaerobic reactions that result in mineralisation of the polluting substances.

The development of high-rate anaerobic reactors, anaerobic treatment has become the economic option in the pretreatment of high BOD industrial effluents. However, high-rate reactors can be used only for the treatment of industrial effluent with BOD in primarily dissolved form. There are no high-rate reactor devices, in use, for the treatment of complex wastewater, i.e., wastewater containing un-dissolved BOD. A survey of prior art, has revealed no apparatus specifically designed to accomplish the primary object of this invention, i.e., the high-rate anaerobic treatment of wastewater containing suspended solids. Therefore, a survey of related art is given below, wherein, some ideas and concepts related to this invention may be found. This survey is merely in support of the practicality of the concepts used in this invention and does not in any way detract from the absolute novelty of the device.

PRIOR ART

Related Art in Anaerobic Treatment of Wastewater:

High-rate anaerobic reactors enable continuous treatment of industrial effluents at small hydraulic retention times. In other words, reactor sizes are relatively small and the BOD load per unit reactor volume per day is high. The primary principle that permits high BOD loading is the retention of a large population of viable microorganisms (biomass) within the reactor by decoupling the retention time of microorganisms from the hydraulic retention time. In simple language, the microbes stay within reactor longer than the liquid being treated.

A variety of high-rate anaerobic reactor systems are in commercial use. A good description of anaerobic processes and reactors is given by S. Stronach, T. Rudd and J. Lester, "Anaerobic Digestion Processes in Industrial Wastewater Treatment", 1986, Springer Verlag, Berlin. The prominent designs can be classified into three families: 1) fixed-film reactors 2) sludge-bed reactors and 3) fluidized bed reactors. However, none of these prior art high-rate anaerobic reactor systems are suitable for the treatment of wastewaters where a substantial quantity of BOD is present as solid matter. This will be clear from closer examination of the operating principles and constructional features of these reactors.

The fixed-film reactors use a stationary inert packing media within the reactor on which microorganisms are retained as a biofilm. The function of the media is enhanced by the increasing the surface area. But the media should have sufficient open porous channels available for free flow with only minor hydraulic head loss and these channel should remain open even after copious growth of biofilm. Among various media types available, are dumped or random packing comprising rings like units and structured media constructed with corrugated plastic sheets jointed to form blocks with dividing straight channels. Both types of packing media are rapidly choked by the deposition of suspended solids present in wastewater. This is especially true in the case of fully submerged upflow type fixed film reactors. In a downflow configuration, the presence of solids in the wastewater will either lead to choking of media or if media has sufficient porosity and straight channels for free outflow of solids, there will be insufficient removal of BOD.

The sludge-bed reactors enable the retention by using the settling property of sludge which is denser than wastewater, if free of gas bubble inclusions. Specially designed "gas solids separators" are mounted on top of reactor to enable settling of sludge. While these reactors are affected by choking problems as is the case with fixed film reactor, they are still not suitable for the treatment wastewater containing solids. Solids in wastewater will rapidly attach or adsorb to the sludge, decreasing its specific gravity and impairing the settleablity of sludge. This lead to the phenomenon of sludge washout, a common and recurring cause of failure of several installations of such reactor. In general, sludge bed reactors are not recommended for wastewater with more than 30% of COD present as insoluble matter. The originator of UASB (upflow anaerobic sludge bed) technology, Professor Gatze Lettinga, from the Netherlands writes in his comprehensive review: "UASB process design for various types of wastewater"; Water Science and Technology, 24, 8, 87–107

(1991), "Regarding the reactor system to be chosen for treating a partially soluble complex wastewater it will be clear that process that apply a high superficial velocity, such as fluidized bed and expanded granular sludge bed (BOSS) reactors are unsuitable, unless they are combined with an adequate pre- or post-clarifier. According to our present experience, application of granular sludge UASB (or EGSB) reactors becomes doubtful at TSS-concentration in the influent exceeding 6 to 8 g/l because at such high TSS-concentration, the segregation between granular and flocculent sludge does not proceed sufficiently rapidly. For high strength wastewaters with high insoluble fraction, (i.e., exceeding 15%) generally conventional digesters are in favour over UASB and other high-rate systems."

Fluidized bed reactor using small biofilm carrier particle in fluidized state is free of clogging, choking or sludge washout problems. But fluidized bed reactors are still not suited for treatment of wastewater with insoluble BOD as solids are not retained in the reactor for sufficient time for the solubilization.

The only reactor system which is suitable for the anaerobic treatment of solid containing industrial effluents is the stirred tank digester, also known as sludge digester. This reactor system is a low rate reactor system where no attempt is made to delink liquid residence time from suspended solid residence time nor is there any attempt to retain and increase the microbial biomass in the reactor. The stirred tank digester essentially maintains a homogenous mixture of solids and liquid for sufficient long duration to effect degradation.

There is only a limited attempt in prior art to develop a high rate reactor specifically for the anaerobic treatment of solids containing effluents. In order to overcome the inadequacies of anaerobic filters and encapsulated bacterial retention systems in treating organic materials with suspended solids content, the prior art has identified the use of the so-called anaerobic activated sludge process, which has also been called the anaerobic contact process, see S. Stronach, T. Rudd & J. Lester; "Anaerobic Digestion Processes in Industrial Wastewater Treatment", 1986, Springer, Verlag, pp. 93–120, 136–147. The anaerobic contact process uses a secondary solids separation stage downstream of the anaerobic reactor and the separated solids are recycled back to the reactor. The secondary separation stages may be gravity settling or mechanically separation such as centrifugation or flotation.

U.S. Pat. No. 5,015,383 describes the difficulties with the anaerobic activated sludge as follows: "The anaerobic activated sludge, or anaerobic contact process, has not been effectively utilized because the bacteria in anaerobic digestion are not easily separated from the mixed liquor effluent. The difficulty his been that actively fermenting organisms do not settle by gravity because of the buoying effects of attached gas bubbles and the fact that the density of the bacteria closely approximate the density of water and do not floc easily. The use of other common liquid/solids separators also have disadvantages. The use of gravity clarification with the addition of high concentrations of flocculating or coagulating chemicals is expensive and harmful to the bacteria. Rapid temperature and pH changes have also been attempted and found to be harmful to the bacteria. Centrifuging has been found to be expensive and detrimental to the bacteria. Conventional dissolved air flotation as well as froth and foam flotation techniques are detrimental to the anaerobic bacteria since even minute amounts of oxygen or air are sufficient to destroy the bacteria. S. Stronach, T. Rudd & J. Lester, Anaerobic Digestion Processes in Industrial Wastewater Treatment, 1986, Springer, Verlag, pp. 35–38". The Burke patent teaches a method of separation using gas flotation, in particular the use of biogas as flotation gas, to overcome separation problems. It would be clear, that this process is hampered by the expense and complexity of the gas flotation process involving mechanical solids removal systems and carried out in closed equipment with a flammable gas. The effectiveness of this process is not known and there is no known installation of the process.

U.S. Pat. No. 4,551,250 teaches a process by which wastewaters containing undissolved solids are treated in a two reactor system in series. A filtering process retains solids in the first reactor of sufficient residence time to be degraded to low molecular weight soluble forms which are passed. While the basic concept of retaining solids for sufficient time by decoupling suspended solids residence time from the hydraulic residence time is the same as in the present invention, there is no mention in U.S. Pat. No. 4,551,250 of the certain possibility of clogging of filter media nor about methods by which this prevented. In contrast to my invention, the process disclosed specifically is for a first reactor to be operated at a low pH in order to inhibit gas production. In a further point of deviation from my invention, the first reactor in U.S. Pat. No. 4,51,250 is preferably maintained in a quiescent state to avoid turbulence and enhance settling. In a still further deviation, the filtering process is accomplished by biofilm media provided in the first reactor. Now, it would be clear to those in the art, that solids settling and clogging of biofilm media is a major problem in such reactors when treating high strength wastes, and in particular wastes with suspended solids. The declogging of such systems is an almost impractical task. In any case, U.S. Pat. No. 4,551,250 does not teach any apparatus that would specifically enable the operation of the process while overcoming the obvious problems with respect to filtration of heavily contaminated wastewaters.

A rather crude apparatus and method for the treatment of complex wastewaters is disclosed in British Patent 2,167,055. This system comprises an anaerobic followed by a downflow or upflow filter. No method of backwashing or declogging of the filter bed is mentioned. It is obvious that this does not support high-rate operation and may be considered merely a modification of a pond treatment system, and may be applied only where a pond is considered appropriate.

A reactor system which theoretically can function with solids containing effluents are membrane bio-reactor systems wherein membrane modules are used for separation of solids from the liquor. These systems have not been successfully applied for anaerobic processes because of membrane fouling problems, which are more than in aerobic processes. In addition, these reactor systems consume large amounts of energy to drive the membrane systems. It may be noted that membrane systems separate very fine and colloidal matter including individual microorganisms in addition to larger suspended solids present in the effluents of interest. Thus the application of membrane systems for the anaerobic treatment of complex wastewaters is an overkill being inappropriate and uneconomic for the application at hand.

Reference may be made to U.S. Pat. No. 4,613,434 which teaches a device for treatment of wastewater by means of anaerobic fermentation comprising a single reactor within which is a lamella and biofilm filter divides the reactor into a mixed lower zone and an upper zone. Although, the lower zone is claimed for 'acidification' and the upper zone is claimed for methanogenesis and there is no mention anywhere in the patent of solids hydrolysis or the filtering of solids, let us assume that the apparatus is applied for suspended solids containing wastewater. It will be immediately clear that the apparatus has no mechanism for clearing choking of filter as a result of retention of filtered solids. The lamella filter in lower zone is of no use for buoyant solids which include fats that are usually lighter than water and other solids with occluded gas bubbles which those in the art will recognize immediately.

Reference may be made to U.S. Pat. No. 5,314,621 disclosing a method for biological purification of wastewater by upflow of wastewater through a buoyant biological filter bed of expanded polystyrene beads with simultaneous injection of air flowing co-currently with through the bed. The filter is backwashed as per the invention by backflushing at a rate of 30 to 80 m/h with treated water stored at an upper part of the reactor. What is non-obvious as per the patent is the provision of brief mini-backflushing operations that expands the filter bed just sufficient to loosen suspended solids within the bed and enable deeper penetration of impurities into the filter bed, thus enabling a longer filter run. It may be noted that the invention is not for anaerobic treatment processes and, further, provides no specific apparatus.

A study undertaken by Nuri Azbar, Pepi Ursillo and Richard E. Speece found in Water Research 35, 3, 817–829, 2001 of the effect of reactor configuration and substrate complexity on the performance of anaerobic process is relevant to the present invention. Based on their experiments with various types of well known reactor, they write: "There appears to be something profoundly beneficial to phasing and staging of anaerobic treatment process for the substrates studied" which include simple molecules such as volatile fatty acids and complex mixed substrates such as baby formula.

There is no known teaching in prior of any special apparatus for the anaerobic treatment of solids containing effluents. Prior art only reveals processes and methods of handling such effluents using known apparatus.

Related art in deep-bed filtration, a common water treatment method for removal of suspended impurities:

Buoyant bed filters form a variety of devices in the well known class of granular bed filters prior art. See for example. "Buoyant media filter" in U.S. Pat. No. 4,446,027 issued May 1, 1984 which uses a 12 inch deep filter bed constructed from commercially available hollow glass beads 0.7 mm in diameter to achieve very good suspended solids removal performance. These devices have so far been intended solely for turbidity removal in water treatment and apparatus is provided for cleaning of the clogged filter by back washing or back flushing. None of the prior art devices and backwash methods are suited for or have the advantage of removal of high concentration of biodegradable suspended solids in heavily polluted industrial waters, which requires the combination of bioreactor and filter.

Another related art is found in "bead filter" devices disclosed for use in nitrification and filtration of aquaculture water. Inventor Robert Malone has shown such devices U.S. Pat. Nos. 5,445,740; 5,126,042; and 5,232,586 wherein a floating filter is used as biofilm carrier device and a filter device for accomplishing nitrification of aquaculture wastewater. In particular the device shown in U.S. Pat. No. 5,232,586 employs a tank having an upper filtration chamber and a lower expansion chamber fluidically connected to each other by a constricted passageway. An inlet line supplies water to the tank through the lower chamber, while a floating media pack forms within the upper chamber during filtration, an outlet line is connected to the tank above the media pack and delivers filtered water back to the aquatic environment. Back-washing is accomplished by the displacement and expansion of the media pack through the constricted passageway using raw water directed to the upper chamber. The turbulence of this expansion causes the filtered matter and sludge to fall toward a drain line located at the bottom of the tank. Since no aeration provision is provided, the apparatus is suitable only for nitrification using dissolved oxygen already present in the wastewater, i.e., only for low concentration ammonia removal. This apparatus is both unintended and unsuitable for the anaerobic treatment of high suspended solids wastewater, as there is no separate provision for gas collection, and gas bubbles will quickly accumulate in the floating media, it is also clear that the apparatus is intended for filtration of wastewater with suspended solids concentration an order of magnitude lower than that of the present invention. U.S. Pat. No. 5,232,586 invention is merely mentioned as a related art and the simple device therein bears little comparison to our reactor designed to meet the myriad operational requirements that a anaerobic reactor high strength complex wastewater. It is therefore clear that these apparatuses do not in any way impinge on the novelty of our invention not only by way of mechanical arrangement of apparatus, but also by way of concept.

Some related art in sewage treatment is given herein as our present invention, in addition to its utility in industrial wastewater treatment, also provides a compact and efficient apparatus for treatment of domestic sewage. Sewage is low-strength wastewater and contains BOD in mostly undissolved form. Sewage treatment can take two forms—centralized treatment plants in towns served by sewerage systems and decentralized home scale or colony scale units where no-frill sewerage systems are not available.

The following quote from 'A review: The anaerobic treatment of sewage in UASB and EGSB reactors'; see Lucas Seghezzo et al., Bioresource Technology 65,175–190 (1998), reveals the importance of a high-rate anaerobic reactor systems for sewage. According to Jewell (1985), 'there is little doubt that development of cost-effective and efficient anaerobic sewage treatment alternative would be one of the most significant advances in waste treatment history'. Lettinga et al. (1987) fully agreed with this statement by saying that . . . a satisfactory application to raw domestic sewage would represent the maximum possible accomplishment for high-rate anaerobic treatment systems'. The term 'high-rate was once used for the later design of sewage sludge digesters, but it now widely used to refer to anaerobic treatment systems meeting at least the following two conditions: (a) high retention of viable sludge under highloading conditions, and (b) proper contact between incoming wastewater and retained sludge (Lettinga et al., 1987)"

Anaerobic treatment has been applied with moderate success for the centralised treatment of sewage in hot climates. UASB type technology is used for primary treatment of sewage. The sewage COD loading rate for UASB type reactors is low (less than 1.5 kg/m$^3$/d) as the primary mechanism of removal of COD and BOD is entrapment of suspended solids in the anaerobic sludge of the UASB reactor, and subsequent degradation. In this manner, suspended solids residence time is decoupled from the hydraulic residence time. But, higher loading rates will lead to sludge washout and failure of the system. Our invention being able to retain solids by active filtration can achieve higher COD and BOD loading without danger of sludge washout. Further it would be clear from the description of the apparatus that floating matter is also effectively retained in our apparatus to complete the degradation process.

In the case of decentralized sewage treatment, septic tanks are effective and commonly used the world over. A septic tank is basically an anaerobic reactor with baffle arrangement to provide sufficient solids detention time to effect degradation. Septic tanks can be used for treatment of composite domestic sewage, or for the treatment of black water from toilets only. The residence time for composite sewage in septic tanks is at least 24 hours, BOD loading rate of the order of 0.3 kg/(m$^3$d). Septic tanks are designed to provide sufficient sedimentation time for separation of solids from sewage and sufficient volume to provide solids residence time for degradation. Higher loading rates are possible in UASB systems because of better contacting and mixing than in septic tanks, enabling lowering of residence time to 6 hours. At even lower residence time, sludge washout occurs in UASB systems. The effective retention of solids by filtration by our buoyant filter bioreactor, and better contacting and mixing conditions enable the anaerobic treatment of sewage in a compact apparatus. No such filter reactors are available in prior art although several filters for post treatment removal of solids and pretreatment removal of solids from septic tanks are mentioned. The present invention is conceptually different from any of prior art devices septic tank and filter systems, being essentially different in principle, configuration, and method of working, by its use of buoyant filter and gas driven backflush system. Merely for the sake the completeness, a brief review of some septic tank filter devices is given below.

Sewage disposal apparatus employing circulating filter media is shown in U.S. Pat. No. 5,308,479. A filter bed using buoyant media is provided for filtration and the media is prevented from clogging by use of a circulating fluid flow generated by either a propeller type agitator or by air sparging. The method in accordance with U.S. Pat. No. 5,308,479 attempts to prevent the clogging of the filter media by moving it continuously in a slow circulation with media particulates being maintained at substantially fixed relative positions during operation. There is no attempt to perform a normal filtration operation (obviously a more effective filtration operation as compared with a moving bed), and intermittent back flush of media by fluidization which are essential in our invention. The U.S. Pat. No. 5,308,479 invention is suited for totally unpowered gravity flow operation unlike our invention.

Suspended solids-free effluent from septic tanks is desired also to prevent clogging of drain field to which it is discharged. Some invention of septic tank filters have this objective—see for example: simple basket type filters U.S. Pat. Nos. 5,198,113 and 6,177,004 or simple pipeline filter U.S. Pat. No. 6,136,190, to a complex and rather impractical layered filter as taught in U.S. Pat. No. 6,024,870. These inventions do not seek to enhance the degradation capacity of the septic tank by improving the loading rate.

OBJECTION OF THE INVENTION

A primary object of the present invention is to provide a reactor system suitable for anaerobic treatment of complex wastewater containing substantial amount of BOD as insoluble matter.

Another object of the present invention is to provide a device that enables the solubilization of biodegradable solids and the further conversion of produced soluble compounds into biogas, the two steps being carried out sequentially in separate compartments arranged in a compact unit.

Another object of the present invention is to provide an apparatus which is capable of effectively removing BOD and suspended matter from the water without requiring a long residence time or increasing the size of the processing vessel.

Still another object of the present invention is to provide an apparatus which enable recovery of biogas.

Yet another object of the present invention is to provide a filter system which is backwashed and de-clogged automatically without the actuation of mechanical or electrical valves or devices with moving parts.

A further object of the present invention is to provide a filter reactor system which is backwashed and declogged whenever the filter pressure drop exceeds a set value.

Yet another object of the present invention is to provide a filter reactor system which is backwashed and declogged at a regular interval.

Still another object of the present invention is to provide a reactor with a filter system that is automatically declogged whenever the filter pressure drop exceeds a predetermined value.

Still another object of the present invention is to provide a reactor that removes biodegradable, settleable and filterable matter from wastewater Still another object of the present invention is provide an anaerobic reactor, wherein anaerobic bacterial sludge is retained within the reactor even when it has a floating tendency as a result of adsorption of low density material such as fats.

Still another object of the present invention is to provide a high rate anaerobic reactor which does not require external energy input for mixing and agitation.

Still another object of the invention is to provide a automatically declogged floating media filter reactor which has a minimum of moving parts and is easy to operate and maintain.

Still another object of the invention is to provide a filter bioreactor that does not require periodic stoppage of flow for backwashing.

Still another object of the invention is to provide a filter reactor with a gas driven backflushing system, which may, where required, operate only on self produced gas.

Yet another object of the present invention is to provide a multistage anaerobic reactor which can remove successively finer suspended particles and breakdown products.

Yet another object of the present invention is to provide multistage anaerobic reactor which can provide a high efficiency for the removal of both suspended and dissolved organic contaminants in a single and compact reactor.

Yet another object of the present invention is to provide a high rate anaerobic reactor, which can be made tall and slender so as to occupy a small footprint.

Still another object of the present invention is to provide a septic tank and aerobic treatment system that can be used for the treatment of black water sewage from single or cluster of dwellings.

Still another object of the present invention is to provide a treatment device that can carry out anaerobic treatment and aerobic treatment of black water sewage without external power sources and without loss of hydraulic head.

All the above objects are achieved by the invention described herein as the buoyant filter bed reactor with gas-driven backflushing and its various embodiments.

SUMMARY OF THE INVENTION

The present invention is the first high-rate reactor, (applying a high superficial velocity), that is capable of treating partially soluble, complex, high-strength wastewaters. Our invention is the first single reactor system in a compact and mechanically simple package that is configured in multiple stages and has the ability to retain complex insoluble substrates in a wide range of particle sizes in spatially separate stages for sufficient residence time to enable complete degradation. Therefore, a highly efficient performance for the removal of both solid and dissolved contaminants may be expected with the present invention. The present invention may be seen as a the first ever synthesis of a innovative self-cleaning deep-bed granular filter with staged anaerobic reactor to achieve the object of solids liquefaction by decoupling suspended solids retention time from liquid residence time. The present invention specifically provides a system for periodic declogging of the filter bed and retention of solids in a first stage digester for liquefaction. Our invention can also perform as a self-pumping system, which can discharge sewage at a hydraulic energy grade above that of the inlet sewage. This function is applicable in the case of high-strength blackwater sewage with COD exceeding 3000 mg/l. There is absolutely no mention in prior-art of a self-pumping system for any sewage or any other anaerobic reactor system.

Accordingly the present invention provides a device for the biological treatment of wastewater containing biodegradable solids comprising a vertically oriented elongated vessel partitioned, in vertical progression, by impermeable substantially horizontal walls, into a top chamber, a bottom chamber and, where required, a multiplicity of intermediate chambers one below the other, in between the top chamber and bottom chamber, each chamber having a gas retaining space and a liquid retaining space, wherein for any neighboring pair of chambers, the lower one is termed "lower chamber" and the upper one is termed "upper chamber", a nozzle establishing fluid communication between the bottom chamber and the outside of the vessel for input of wastewater into the vessel, a nozzle establishing fluid communication between the liquid retaining region of the top chamber with the outside of the vessel for discharge of treated wastewater from the vessel, and arranged so as to retain a level of liquid within the top chamber, a nozzle for discharge of gas from the gas retaining space of the top chamber, and further comprising for every pair of neighboring chambers, at least one filter chamber having at least one inlet communicating fluidly between liquid retaining part in the lower chamber and at least one outlet communicating fluidly with the liquid retaining part of the upper chamber, a filter bed constructed using a particulate bed of inert material with specific gravity less than 1.0, placed within the said filter chambers, and partly filling its internal volume, at least one gas conduit establishing fluid communication between gas retaining space in the lower chamber with the upper chamber, and a device enabling periodic discharge and stoppage of flow of gas through the said gas conduits.

In a preferred embodiment of the invention the reactor is divided by a fluid tight horizontal partition plate into upper and lower chambers. The filter chamber is constructed as modular units, using a length of pipe of suitable diameter, vertically penetrating through the partition plate. The module has perforations below a predetermined level in the cylindrical wall opening out into the lower chamber and an impermeable end cap at the bottom. At the top end, a perforated end cap is fitted, opening out into the upper chamber. The module is filled with the buoyant filter media, particle size chosen to effect required degree of filtration of the suspended solids in wastewater. The perforations in the module are chosen to be less than the diameter of the filter particles thus effectively confining the filter bed inside the module. As the bottom end cap is impermeable, it serves to deflect and prevent the escape of rising bubbles into the filter module. The apparatus operates by collection of gas above the liquid surface in the lower chamber below the horizontal partition in the space formed by the inner walls of the vessel, bottom surface of the horizontal partition and outer walls of the filter chamber, above the level of perforation in the filter chamber. The accumulation of gas drives the liquid in the lower chamber through the filter into the upper chamber. Suspended solids are filtered by the granular bed. When sufficient gas has collected in the lower chamber, it is released to the upper chamber.

In yet another preferred embodiment of the apparatus, the gas conduit can be shaped to form simple hydraulic automatic discharge and stop system. In this system, the gas conduit forms the shape of a U inside the lower chamber, one arm of the U opening out into the lower chamber and the other arm extending into the gas space of the upper chamber. The diameter of the conduit is chosen such that two phase flow of liquid and gas in the operational ranges of gas discharge is the regime of "liquid plug" pushed by gas and not in the bubble flow regime. This may be readily determined by those knowledgeable about two phase pipe flow. Initially, the short arm of the U is totally immersed in liquid in the lower chamber. As gas accumulates in the lower chamber the short arm of the U shaped gas conduit is exposed and a plug of liquid in the short arm of the U is pushed by the hydrostatic pressure into the rising longer arm, till it is entirely displaced from the shorter arm. At this stage, the gas pressure in the lower chamber gas space just exceeds the maximum hydrostatic pressure of the liquid plug which is then driven upwards and discharges into the gas space of the upper chamber. Thus, gas flow from lower chamber to upper chamber takes place, simultaneously with back flow of liquid from upper chamber to lower chamber through the filter bed. As the liquid level in the lower chamber rises and reaches above open end of the short arm of the U, the flow of gas is cut off by the formation of a liquid plug inside the gas conduit. The sequence of step is repeated as gas accumulation proceeds once again, thus enabling repeated and period backflushing. Further, in order to prevent the entry of suspended solids or floating matter into the U tube, a perforated hood device may be provided at its lower chamber entrance.

In a further preferred embodiment of the invention, gas recirculation to the lower chambers using a pump from a gas reservoir or from an upper chamber gas collection space is provided. This can be used to enhance the frequency of backflushing or obtain a longer duration backflush by supplementing gas generation The gas recirculation also aids in vigorous mixing of the reactor contents to improve mass transfer and enhance the rate of reaction.

In yet another embodiment, the apparatus of the invention may be operated as a sequencing batch reactor—"fill, reactor and draw" method—in a most natural and automatic manner. In this embodiment, the wastewater to be treated is charged into the apparatus which already contains a volume of reacted liquor and a large population of anaerobic microorganisms. The reaction commences producing gas in the lower chamber. The accumulation of gas in the lower chamber displaces the lower chamber liquor through the filter bed into the active sludge in the upper chamber, wherein further reaction and gas production occurs. At the end of the reaction, the reacted liquor may be withdrawn from the upper chamber.

Alternately, an overflow outlet may be provided in the upper chamber, so that treated effluent overflows from the upper chamber when the liquid level rises as a result of accumulation of gas in the lower chamber. Periodically the accumulated gas in the lower chamber is discharged, effecting the backflushing of the filter bed. The gas discharge cycle may be repeated several times if necessary before the reaction is complete. In this mode of operation, the volume of wastewater charged into the reactor during each filling cycle is equal to the volume of gas discharged during one gas discharged cycle and discharged of treated effluent takes place only during the first gas discharged cycle.

A further advantage of the invention is obtained if a non-return valve device is provided at the liquid inlet to the device, which does not permit backflow of liquid from the reactor. Initially the reactor contents are at a hydraulic level which enable the filling of a charge of wastewater by gravity flow. Upon filling, the non-return valve closes preventing reverse flow. As the gas generation proceeds, liquor is displaced to the upper chamber till it reaches an outlet provided at a hydraulic level which may be above the hydraulic level of the inlet stream. The reactor may be so configured so that the upper chamber is tall and narrow with respect to the lower chamber to enable pumping to higher elevation. In addition, the gas discharge volume may be chosen such that there is only one gas discharge operation per sequence. This enables the displacement of a large quantity of liquor from the lower chamber of reactor to the upper chamber. The advantage of this operation is that wastewater is discharged fairly continuously during the gas generation process, at a higher hydraulic level as compared to the source. Hence the reactor, besides providing anaerobic treatment, also provides the function of an equalization tank and pump system for downstream secondary treatment. It is conceivable that the pumping effect can be beneficially used for downstream treatment, for example, by an exposed aerobic trickling filter or a solar disinfecting basin, while the wastewater drain and suitable collection sump is underground. Therefore a totally unattended operation of the invention is possible with no external power source for anaerobic and aerobic treatment of highly contaminated wastewater.

Another embodiment of the invention is the multistage buoyant filter bed reactor, where there are several intermediate stages between the bottom stage and the top stage. The passage of liquid from bottom to top passes through filter bed at each intermediate stage. This enables very high efficiency of suspended solids and dissolved organic matter removal. The filter beds may be constructed so as to retain coarse suspended matter at the lower stage with each succeeding stage retailing progressively finer solids. This is easily accomplished by choice of the filter media and in particular the particle size of filter media. Gas collected in the bottom stage discharges periodically to the second stage, backflushing the filter bed connecting the two stages. As gas collection at the second stage exceeds the predetermined volume, it is discharged to the third stage backflushing the filter bed at the second stage. This sequence is repeated at each stage to set up a cascade till ultimately the gas is discharged from the system and all filters are flushed. Those in the art will acknowledge the extreme difficulty in filtration separation of wastewater containing large sized to fine sized suspended solids organic matter and will readily appreciate advantages of the multistage buoyant filter bed reactor of this invention which is not only able to separate but also to degrade the separated matter, in a single, compact and energy efficient device.

BRIEF DESCRIPTION OF THE ACCOMPANYING DRAWINGS

DETAILED DESCRIPTION OF THE INVENTION

Figure 1:
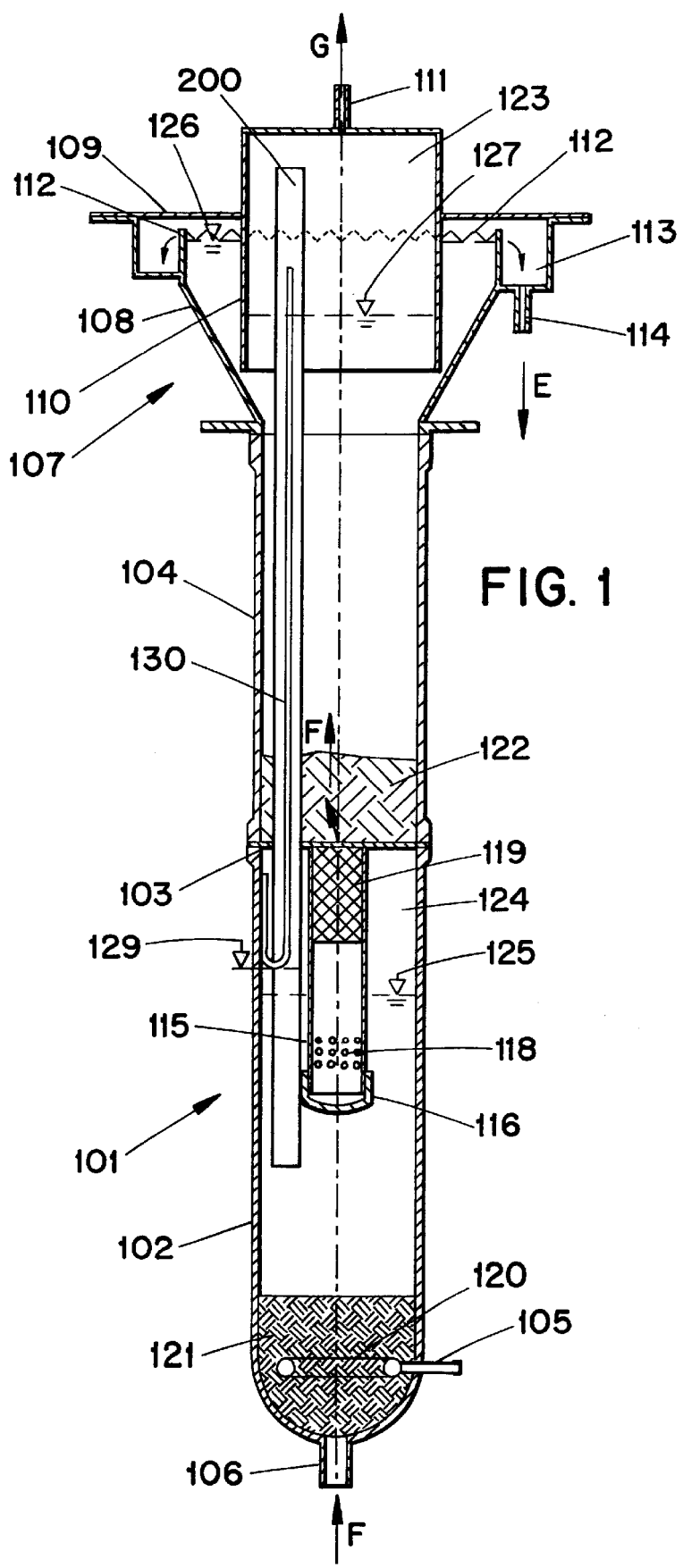
FIG. 1 represents a fully functional laboratory realization of a two chamber buoyant filter bio-reactor constructed using glass and steel.

The invention is explained with respect to the drawing accompanying this specification:

In the drawings many details pertaining to fabrication not bearing upon points of novelty are omitted in the interest of descriptive clarity. Functionally equivalent components are given identical reference numbers in the various drawings. These components are explained in detail for the first occurrence only for sake of brevity.

FIG. 1 represents a fully functional laboratory realization of a two chamber buoyant filter bio-reactor constructed using glass and steel. The reactor vessel 101 is partitioned into lower chamber 102, and upper chamber 104, by a plate 103, fixed impermeably between the two chambers. In actual construction of this laboratory realization of the invention, the plate 103, is clamped together in leak tight manner between two flanged glass columns each of 100 mm internal diameter. The lower chamber 102, is provided with a dished bottom on which is provided nozzle 106, for input of the feed wastewater by means of a pump (not shown). A gas solids separator 107, made of steel is mounted on top of the upper chamber. The gas solids separator has an outer shell 108, shaped as a inverted frustum of a cone which is jointed in a leak tight manner to the walls of the upper chamber 104, at its top. An overflow weir 112, allows liquid to overflow from the reactor vessel into a circumferential collection launder 113, and thereafter can be taken out of the reactor through an outlet nozzle 114. A cylindrical glass vessel 110, with a open bottom and an impermeable top is mounted on top of the gas-solid-separator, by a fixing means 109, such that its cylindrical wall projects inside and off the sloping side walls of the gas-solid-separator. The vessel 110, has an inside diameter larger than the inside diameter of the upper chamber 104 and thus forms a liquid sealed gas collection space 123 inside the lid. A gas outlet nozzle 111 connects fluidly the gas collection chamber with a constant pressure gas reservoir (not shown). A filter chamber 115, constructed as cylinder, is mounted inside the lower chamber 102, with its cylindrical walls joined impermeably to the partition wall 103. The partition wall 103 is provided with perforations 117 (see FIG. 3) establishing fluid communication between upper chamber 104 and the filter chamber 115. The filter chamber 115 is also provided with perforations 118 on the cylindrical wall at its lower end and a impermeable end cap 116. A particulate filter bed 119 made of polystyrene beads is confined inside the filter chamber 115. The filter bed 119 occupies only part of the volume of the filter chamber. A glass tube open at both ends, called "return tube 200", is provided penetrating partition wall 103 and sealingly fixed to it. Return tube 200 is terminated at top in gas space 123 and at bottom well within the lower chamber 102. A gas conduit tube 130, made of flexible tubing, is provided within return tube 200 and sealingly penetrates out of the return tube 200 within the lower chamber. The tube 130 is provided with a U bend within the lower chamber 102. An additional nozzle 105 extending inside to form perforated pipe ring 120 is provided in lower chamber for sparging gas recirculated from the gas space 123.

Figure 2:
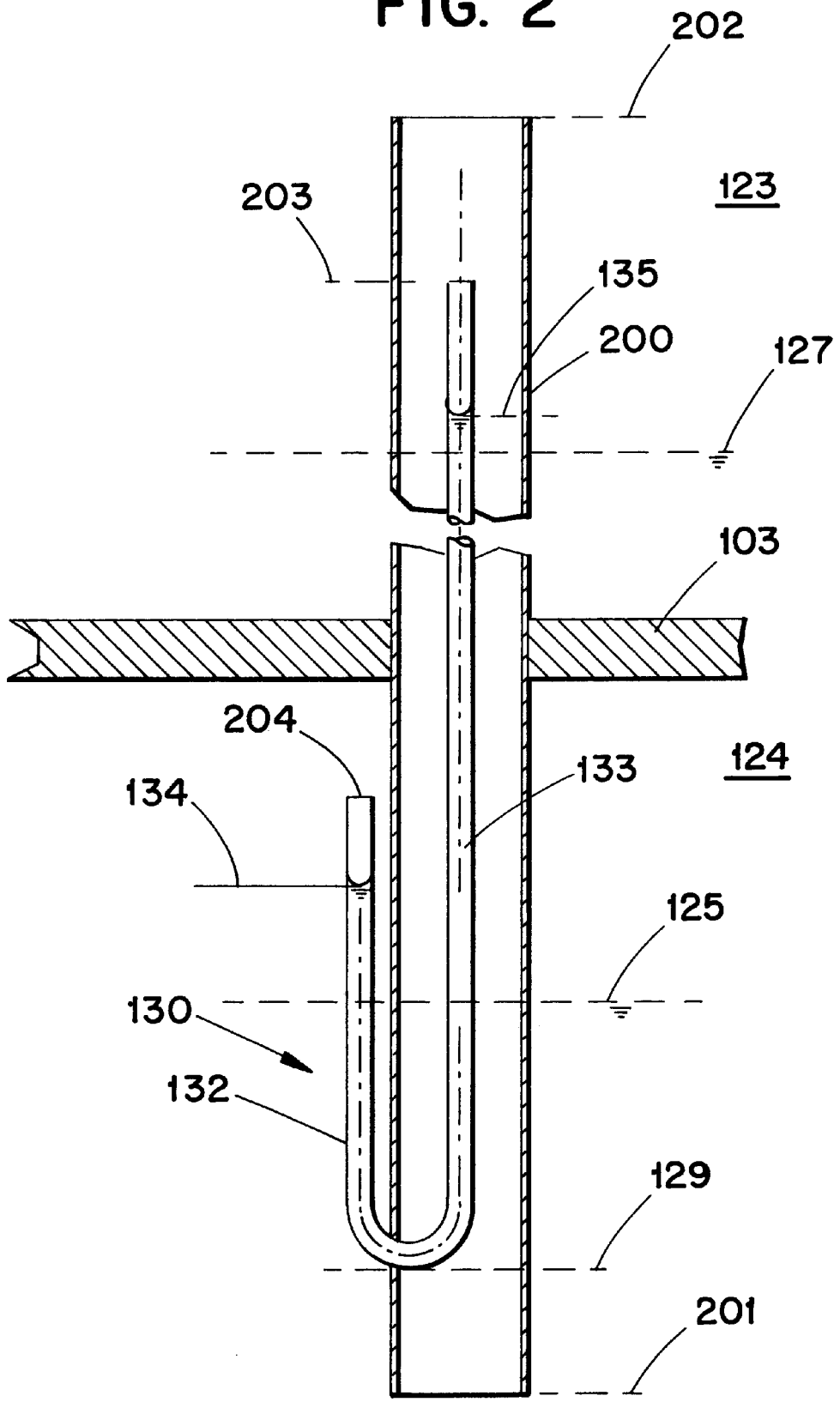
FIG. 2 represents detail of automatic discharge gas conduit mechanism.

FIG. 2 represents detail of automatic discharge gas conduit mechanism, hereinafter called U tube device. The tube diameter on this vessel was chosen to be 6 mm internal diameter. Larger diameter tubes would be chosen for larger reactors. Any diameter tube may be chosen as long as two phase flow in slug flow regime is obtained during gas discharge operation. The longer limb 133 of the U tube opens inside a larger diameter return tube 200. The return tube 200, open at both ends, is fixed sealingly penetrating the partition wall 103 between the upper chamber 104 and lower chamber 102. Return tube 200 opens at its lower end at level 201 which is well below the lower extremity 129 of the U tube. The top level 202 of return tube 200 is above the level 203 of upper extremity of the U tube. Both tubes are terminated in the gas space 123 of the upper chamber and above the liquid overflow level 126 in the apparatus. Further, the vertical distance between 203 and 127 is selected to exceed vertical distance between 204 and 129.

Figure 3:
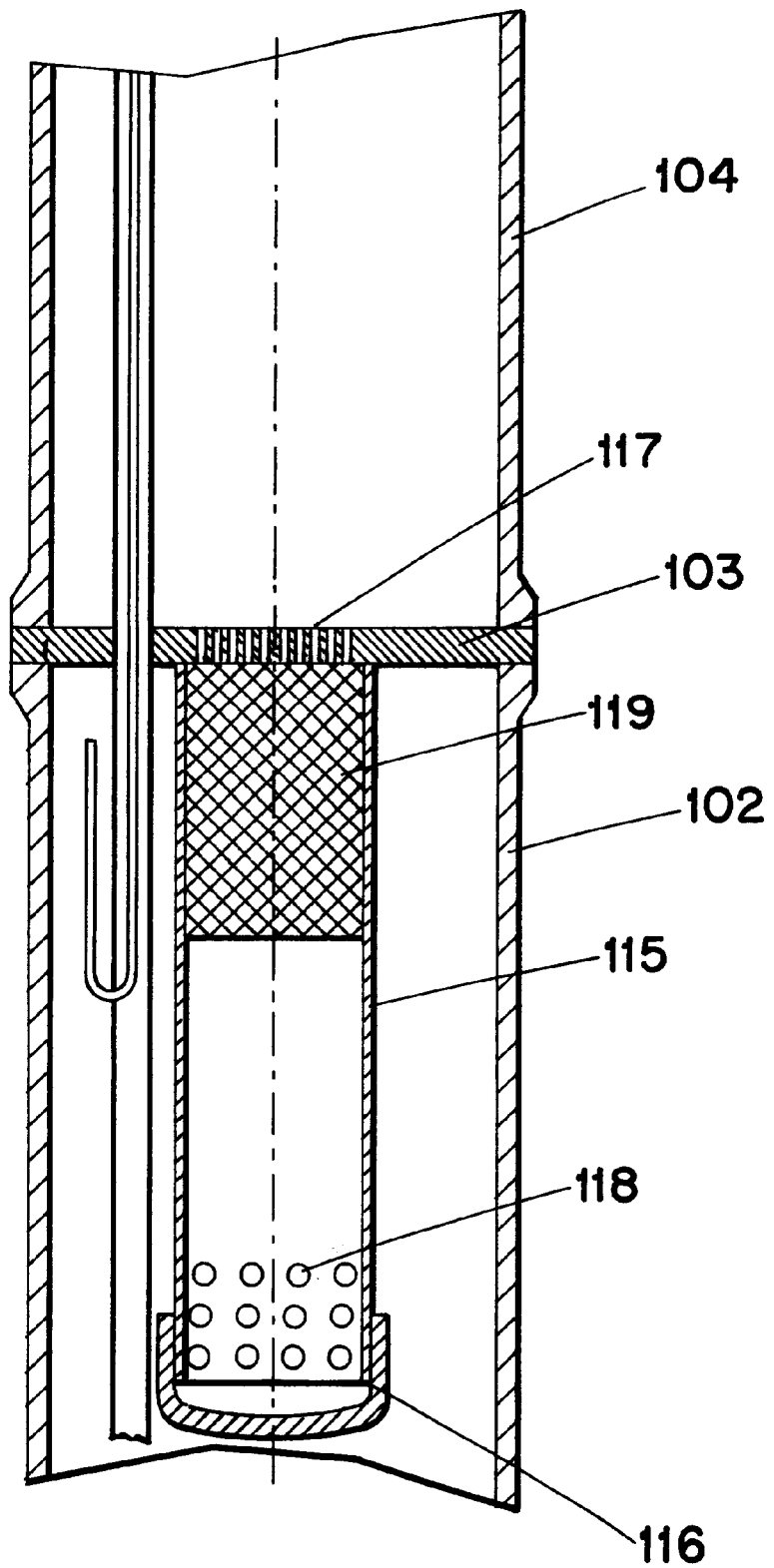
FIG. 3 represents detail of filter chamber.

FIG. 3 represents a detail of filter chamber 115. The vertical orientation of the filter chamber ensures that rising gas bubbles are deflected away from the openings 118. The diameter of the openings provided was 1 mm whereas the filter bed particles were 1 to 2 mm size. The filter bed occupies about 50% of the internal volume of the filter chamber.

The operation of the invention is explained below with respect to the laboratory scale model represented in FIGS. 1 to 3. The operation of the subsequent manifestations follows similar principles and has been omitted, except where there are significant differences.

The reactor vessel is filled with deoxygenated water. The particulate bed being of specific gravity lower than water, forms a floating bed filter bed 119 against the top perforated cover 103. The reactor is provided with sufficient quantity of acclimatised anaerobic microbial sludge, which may have granular or flocculant settling characteristics. This forms a sludge bed depicted as 121 in the lower chamber 102 and a sludge bed 122 in upper chamber 104. Inert gas is recirculated through the gas sparging system 120. The continuous pumping of wastewater (arrow F) containing suspended organic matter is commenced through nozzle 106. As pumping proceeds an equivalent quantity of liquor in chamber 102 is forced into filter chamber 115 through perforations 118, permeates through the filter bed 119, and exits (arrow FI) via perforations 117 into the chamber 104. Filtration action at the filter bed 119 retains suspended particles in the wastewater passing through the bed. Some part of soluble matter in the wastewater is immediately converted to methane and carbon dioxide by microbial action in lower chamber 102. The produced gas and the recirculated gases are collected in the space 124 in the lower chamber 102, lowering the liquid surface 125, the displaced liquor again exiting into upper chamber 104 through the filter bed 119. The filtered liquid containing part of the soluble convertible BOD is contacted with the sludge 122 in chamber 104 for further conversion to gas, which is collected in gas space 123 which exits through the nozzle 111 to a constant pressure gas storage tank. Some part of the gas is reciruculated back to nozzle 105 by the gas pump (not shown). A continuous overflow over weir 112 at level 126 is also set up. The level difference between 126 and 127 is maintained at constant level because of the constant pressure gas receiver connected to gas outlet port 111. It may be noted that the gas receiver is usually at slight pressure above atmosphere and therefore, the liquid surface 127 is below the liquid surface 126 at the overflow level. As the operation proceeds, the liquid surface 125 is pushed below the lower level 129 of the gas conduit tube. Initially liquid fully fills the smaller limb 132 of the gas conduit tube, 130, and the longer limb 133 contains liquid to a level determined by the pressure difference between the open ends, which is given by the vertical distance between 134 and 135 as in the case of a manometer. As gas pressure in 124 increases, the liquid in the shorter limb 132 is pushed into 133, lowering the level 134 and raising the level 135. The gas pressure in 124 is given by the vertical distance between 135 and 134 plus the constant gas pressure in 123. Eventually, the liquid level 134 reaches the lowest point of the U, at 129, whereupon no further increase in gas pressure can be balanced by the hydraulic pressure of the liquid column in the gas conduit tube 130 and gas will flow out of 124 through the tube 130, into space 123. The tube diameter is chosen such that gas velocity is the range where slug or plug flow phenomenon is observed. The liquid column is therefore pushed out of the open end of 133 as a slug and a free flow of gas from 124 is obtained.

It is noted that the gas conduit tube in the shape of a U is difficult to fabricate and assemble inside the return tube as shown in FIG. 2, which is merely a working laboratory model. In actual application, the U will be replaced by a functionally equivalent combination of 90 degree elbows and jointed pipe sections.

The slug of liquid discharged from 135 falls back into the lower chamber 102 via return tube 200. It may also be noted that return tube 200 extends above the open end 203 of the U tube, and terminates at level 202, which is sufficiently above liquid level 127, to prevent flow of liquid from chamber 102 to 104 via this tube. In fact, it may be noted that the liquid level inside return tube 200 will be higher than the level 127 by an amount equal to the pressure drop across the filter bed 119. It will be obvious that the tubes 200 and 130 can be so configured as to capture a high velocity slug of liquid ejected from the U tube. Further, obvious variations of this automatic gas discharge system which are functionally equivalent includes 130 arranged substantially outside the tube 200 with only the outlet of 133 configured to discharge inside 200. It may also be understood that multiple gas conduit tubes may discharge their liquid contents into a single return tube 200. Yet another functionally equivalent variation which may be made explicit, is the arrangement of a return chamber integrally constructed in the reactor vessel, instead of a return tube.

The discharge of gas from 124 leads to a liquid backflow from the upper chamber to the lower chamber through the filter chamber 115. The flow enters through perforations 117 and exit through perforations 118. The back flow velocity is much higher than the filtration velocity, and the filter bed 119 expands to a fluidized state as a result, flushing out embedded suspended solid back into the lower chamber. This process is hereinafter termed "backflushing". The bed expansion also breaks bonding of particles because of microbial biofilm growth. As a result of the backflushing flow, the liquid surface 125 in lower chamber 102 rises till it reaches above 204, the open end of limb 132 of the gas conduit 130. The liquid then flows into the tube 130 to once again form a hydraulic column which balances the gas pressure difference between 124 and 123, thus stopping gas flow. This sequence is repeated, the frequency of operation determined by the gas production and recirculation rate. The back flushed solid particles are thus retained in the lower compartment for duration sufficient for solubilization by microbial action An advantage of this U tube gas discharge device is that the automatic backflush system requires no electrical power nor does it involve any mechanical moving parts.

A further advantage of this U tube gas discharge device is that in addition to backflushing at a set time interval, the device is also automatically backflushed whenever there is an abnormal increase pressure drop in the filter bed 119 as a result of clogging. An increase in pressure drop across the filter bed will be seen as an increase in gas pressure in gas collection space 124. This increase in pressure pushes down liquid level 134 in U tube limb 132, irrespective of the liquid level 125. If the gas pressure is sufficiently large, the level 134 reaches level 129, and gas is released inducing backflushing of filter.

Figure 4:
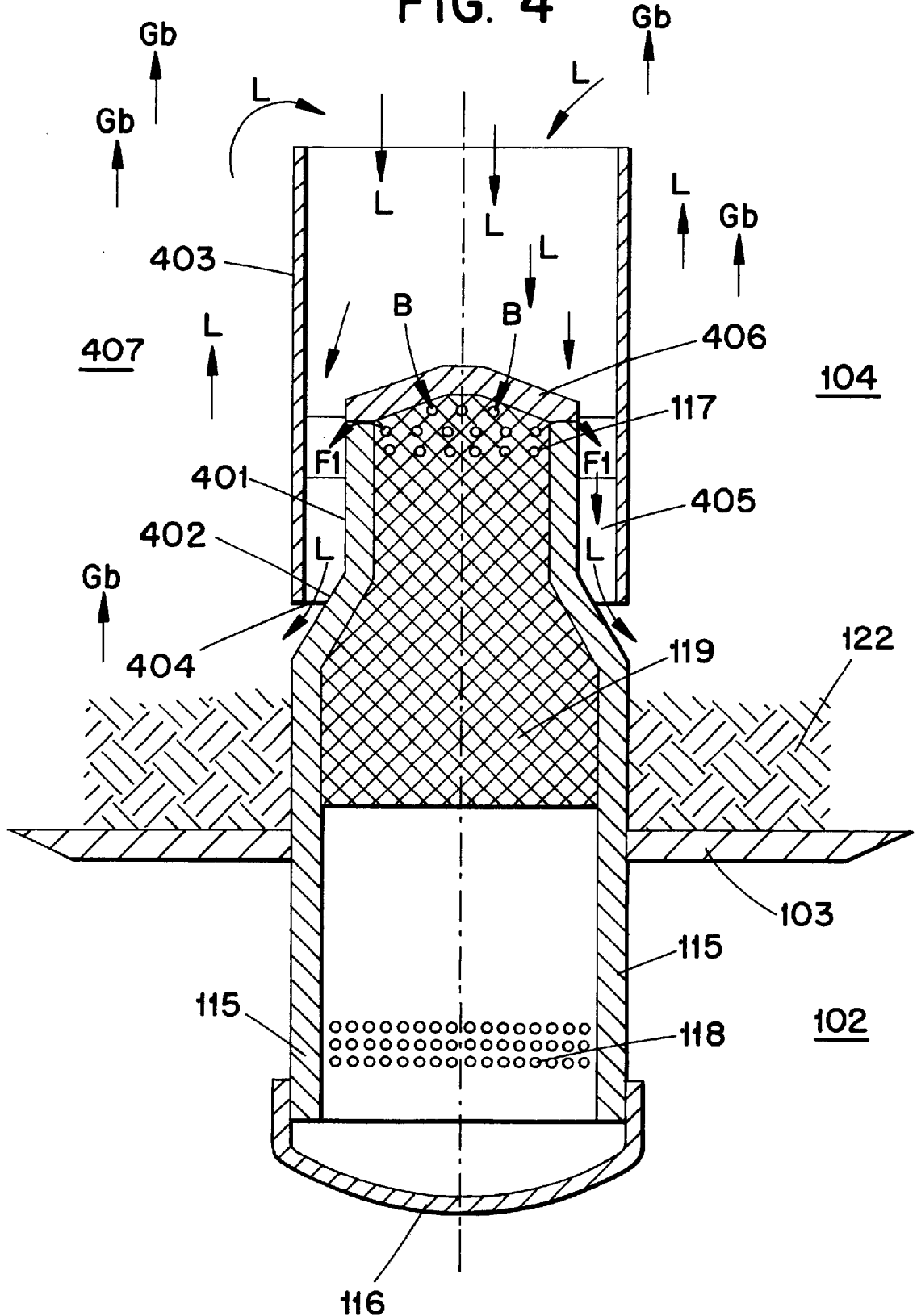
FIG. 4 shows detail of a baffle device that permits preferred flow patterns during normal operation and backflushing.

FIG. 4 shows a detail of a baffle device that permits preferred flow patterns during normal operation and backflushing. The device described in FIGS. 1 to 3, allows backflow of sludge from the upper chamber 104 to lower chamber 102 during backflushing. This in itself can be used advantageously because it selects the retention of larger sized sludge granules in the upper chamber. The device can also be used without difficulty when the upper chamber is operated as a fixed film reactor as will be described in FIG. 9. But in certain situations, it may be advantageous to prevent backflow of sludge during backflushing. An improved design of filter chamber 115 that is able to prevent backflow of sludge 122 from upper chamber 104 into the filter bed 119 during backflushing operation is shown in FIG. 4. The backflow of sludge during backflushing can be prevented quite easily by extending filter chamber 115 into the upper chamber so that its upper perforations are at a level above the upper level sludge bed 122. A further improvement in performance can be achieved by enabling contact of filtered outflow liquor (arrow F1) with sludge 122 during normal operation, while only clear fluid above 122 is utilized for backflushing. This objective is realized by the design of a baffle means described herein. A generally cylindrical filter chamber in cross sectional view is represented. FIG. 4 is to be read with other figures, with functionally equivalent features having the same reference numbers as in previous figures. The filter chamber 115 at its upper end is shaped as a cylinder 401 of smaller diameter than the lower portion, both parts being jointed by a frustum of a cone 402. It is mounted, sealingly penetrating partition wall 103 separating the upper chamber 104 from the lower chamber 102. The filter chamber is filled partly with a participate media filter bed 119 and confined by lid 116 at the lower end and 406 at the upper end. A sludge bed 122 is shown at its position in the upper chamber. The filter chamber is provided with a multiplicity of perforations 117 at its upper end which extends above the sludge bed level in the upper chamber. A cylindrical baffle termed "sleeve 403" is provided as circumferential sleeve covering the smaller diameter portion 401 of the filter to form a annular space 405 between sleeve 403 and 401 and a ring aperture 404 between sleeve 403 and the frustoconical portion 402. The sleeve 403 has an outer diameter not exceeding the outer diameter of 115. During normal operation, rising gas bubbles generated by the action of sludge 122 are confined to the region 407 outside the sleeve 403. The rising gas bubbles (arrows Gb) set in motion a circulating liquid flow (arrows L) which is downward inside the sleeve 403. The circulatory flow is directed toward the sludge through the ring aperture 404. The filter outflow (arrows F1) is carried along with this flow to contact with the sludge bed 122. During backflushing operation, the flow from the upper part of chamber 104 (arrows B), relatively free of sludge, is directed towards the perforations 117 preference to flow from the sludge region 407 because of the relatively higher resistance to flow through the ring aperture 404. It may be noted that the resistance to flow of the ring aperture is significant only during the high flow condition at backflushing and is insignificant for the gentle circulatory flow condition during normal operation. Thus the device enables contacting of filtered liquor with sludge and avoids sludge entry from the upper chamber 104 into the filter bed during a backflushing.

Figure 5:
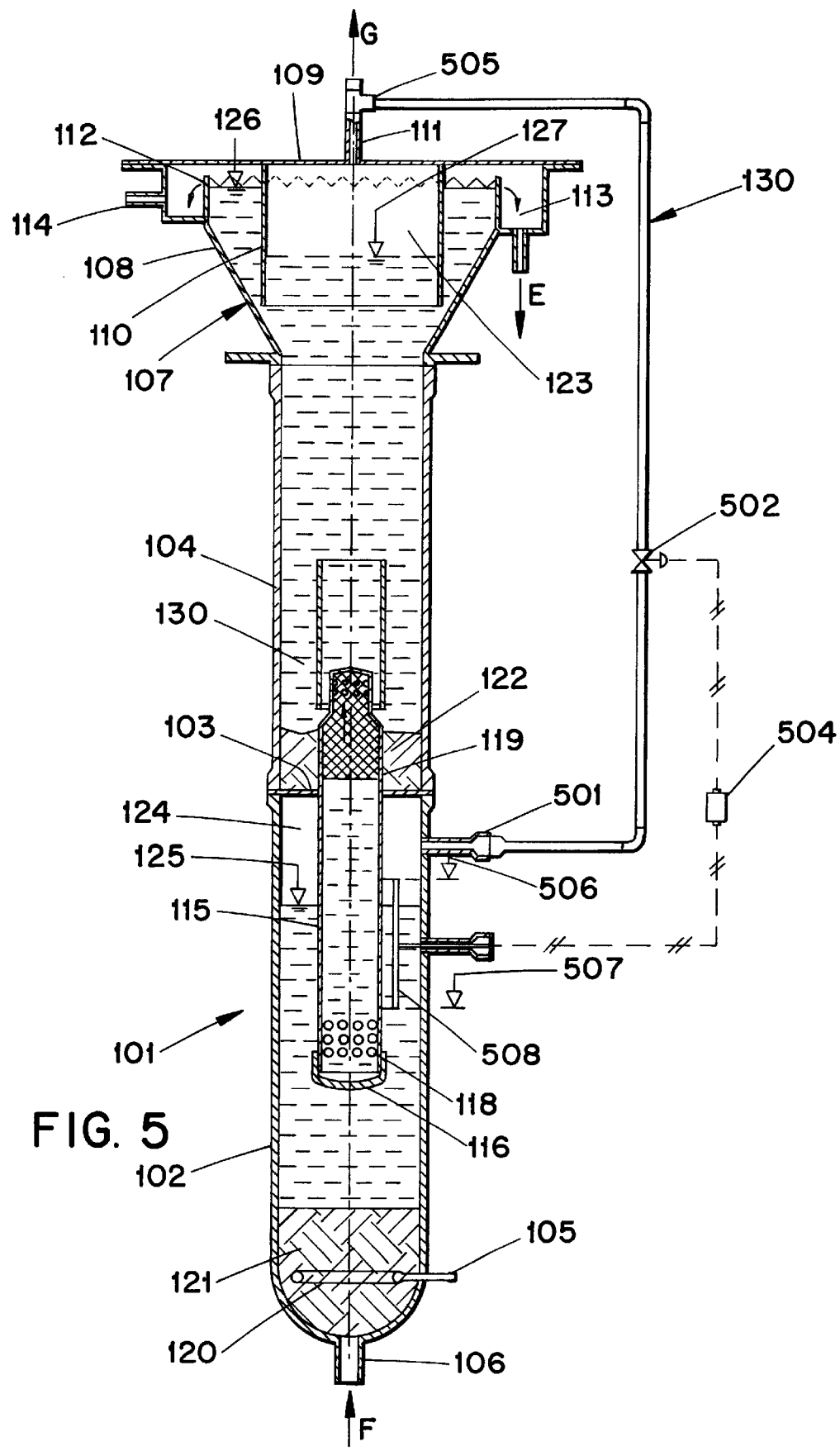
FIG. 5 represents an anaerobic reactor provided with a gas release controlled by a electromechanical device.

FIG. 5 represents an anaerobic reactor provided with a gas release controlled by a electromechanical device, such as a solenoid valve. An external gas conduit 130 is shown, fluidly connecting the gas retaining space 124 of a lower chamber 102 and the gas retaining space 123 of an upper chamber 104. The conduit is connected to the lower chamber at a nozzle 501 and connected to the upper chamber gas outlet 111 by a tee connection 505. An automatic operating valve 502 is provided on the gas conduit 130. A level sensor 508 which can sense liquid surface at levels 507 and 506 is arranged in the lower chamber. The level sensor 508 excites device 504 with appropriate electronic circuitry that signals valve 502 to open at a level 507 and close at level 506. The nozzle 501 is provided at a level above level 506. During operation, the build-up of gas in 124, as in earlier devices, pushes the liquor in 102 through the filter bed, lowering the liquid surface 125. At the level 507 the level sensor activates the opening of valve 502, leading to gas discharge and backflushing of filter bed. The liquid level 125 rises and at level 506, the level sensor activates the closing of valve 502 and the cycle is repeated. An advantage of this arrangement of the invention is that there is no restriction on gas conduit 20 diameter and there is no entry of lower chamber liquor into the gas conduit obviating the need for a return tube. This arrangement is conveniently used in large size industrial anaerobic reactors which are already provided with instrumentation and automation.

Figure 6:
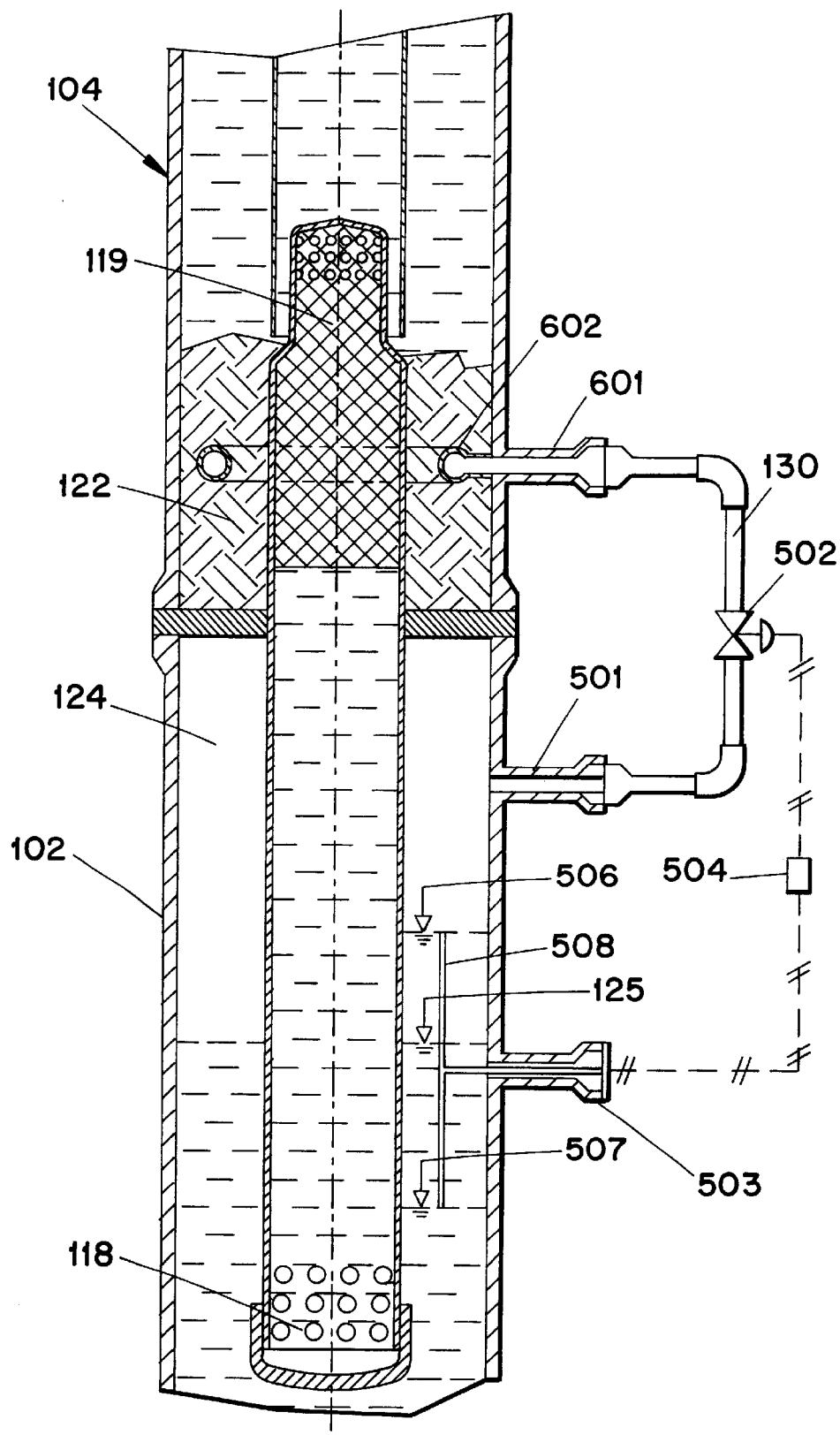
FIG. 6 represents another configuration of an anaerobic reactor provided with a gas release controlled by a electromechanical device.

FIG. 6 represents another configuration of an anaerobic reactor provided with a gas release controlled by a electromechanical device The upper chamber 104 is provided with a nozzle 601 and a gas sparging ring 602 for agitating sludge 122 contained in the chamber. Gas conduit 130 connects gas space 124 of lower chamber to the 601 nozzle of the upper chamber 104. Also provided are an automatic valve 502 in conduit 130, level sensor 508 and electronic circuit device 504 for actuating valve 502 as previously described in FIG. 5. The gas released through conduit 130 is sparged into the liquid in the upper chamber 104 through a sparging device 602. The sparging device shown is constructed from a perforated pipe in ring configuration but it may be understood that other sparging devices may also be used. The advantage of this system is the mixing of contents of the chamber 104 during the backflushing operation. The mixing of chamber contents will promote the rate for conversion of organic matter. It may also be noted that the entrainment of gas and/or sludge into the filter bed 119 daring can be prevented by the use of a cylindrical baffle device previously described in FIG. 4.

Figure 7:
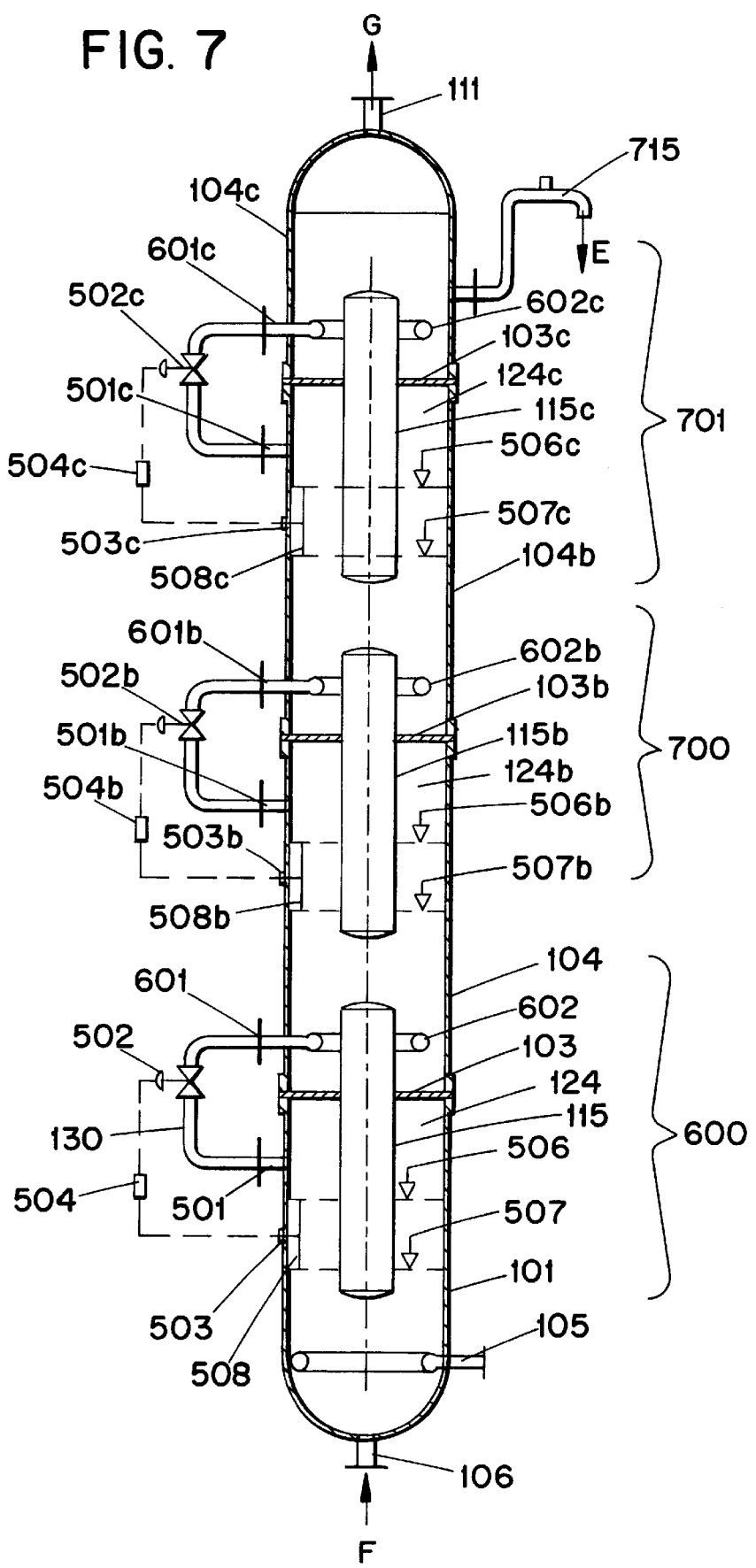
FIG. 7 represents a multistage reactor with three filtration stages.

FIG. 7 represents a multistage reactor with three filtration stages. Components of identical functionality with previous figures have identical reference number and are not described further. This reactor is a vertical progression of units 600, 700, 701 each functionally identical to assemblage 600 previously described. When a predetermined quantity of gas has accumulated in space 124, gas release is triggered by level detector 508, switch 504 and control valve 502 as previously explained in the description for FIG. 5. Gas release backflushes buoyant filter bed in module 115. The gas is released into upper chamber 104 and accumulates in space 124b. When a predetermined quantity of gas has accumulated in space 124b, gas release mechanism is triggered by level detector 508b, switch 504b and control valve 502b as previously explained in the description for FIG. 5. Gas release backflushes filter in 115b in the second stage marked 700. The gas released from 124b accumulates in space 124c and the process is repeated in stage 701 as described for stage 700. At each stage, further anaerobic degradation by contained microbial sludge, results in removal of BOD. In this manner, the operation of the apparatus enables filtration and reaction in a staged manner and backflushing of each filter in a staged manner. After 3 stages of filtration and reaction, the final treated effluent is discharged through an outlet 715 fitted with a siphon break means. The gas released from space 124c finally exits the reactor through outlet 111. A gas-solids-separator is unnecessary after 3 filtration stages, as the effluent will be substantially free of solids.

It would be understood by those in the art that more than three filtration stages can easily be constructed in this manner and each successive filtration stage can be arranged for retention of progressively finer particles by suitable choice of buoyant filter media particulates. In this manner it may be ensured that a very high efficiency of removal of both suspended solids and their soluble degradation products may be obtained. In this context, it is worth recalling the "profound" advantages of staging for the degradation efficiency mentioned in the Water Research 2001 reference, and it may noted how this invention is uniquely and excellently suited for such staging for wastewaters with any level of complexity.

Another point of interest for the construction of the reactor, is that at each stage of the reactor, gas production leads to progressively larger quantities of gas to be released and therefore, higher frequency backflushing may be achieved for progressively finer filter media.

Figure 8:
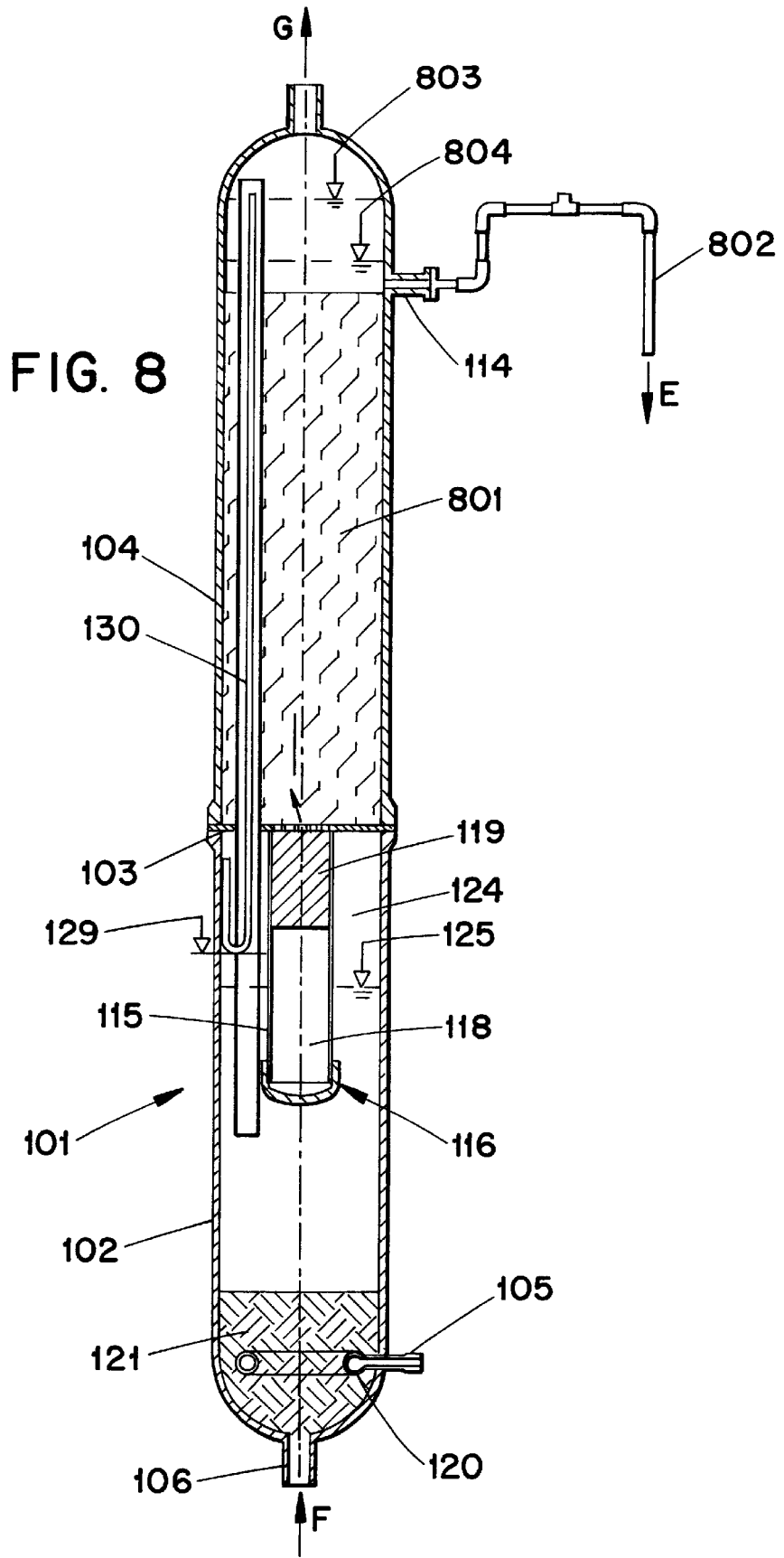
FIG. 8 represents a realization of the invention, showing a two-stage laboratory scale reactor with a biofilm reactor as a second stage.

FIG. 8 represents a realization of the invention, showing a two-stage laboratory scale reactor with a biofilm reactor as a second stage. Once again, components, functionally identical to those of earlier figures are identified by same reference numbers as in previous figures and are not explained further. The upper chamber 104 is filled with a biofilm support packing material, 801, several of which is commonly known in prior art. The upper chamber 104 is also provided with a effluent discharge nozzle above the packing level and fitted with a common siphon break overflow assembly 802 to maintain a maximum level of liquid 803 in the reactor. Suspended solids are retained substantially in the lower chamber and dissolved contaminants are passed on to the upper chamber wherein reactions catalysed by an attached biofilm on the packing material result in thither conversion of BOD to gaseous products. This reactor is also backflushed by the mechanism previously described in FIG. 2. The level of liquid in the reactor upper chamber fluctuates between 804 at end of backflush and 803 at discharge level. Large back-flow velocities obtained during the backflushing operation also help in removing biofilm debris from the packing material. It may clearly be understood that biofilm stages may used as final stage of multiple filter stage reactors very profitably to obtain extremely high BOD and COD removal efficiency for complex wastewaters.

Figure 9:
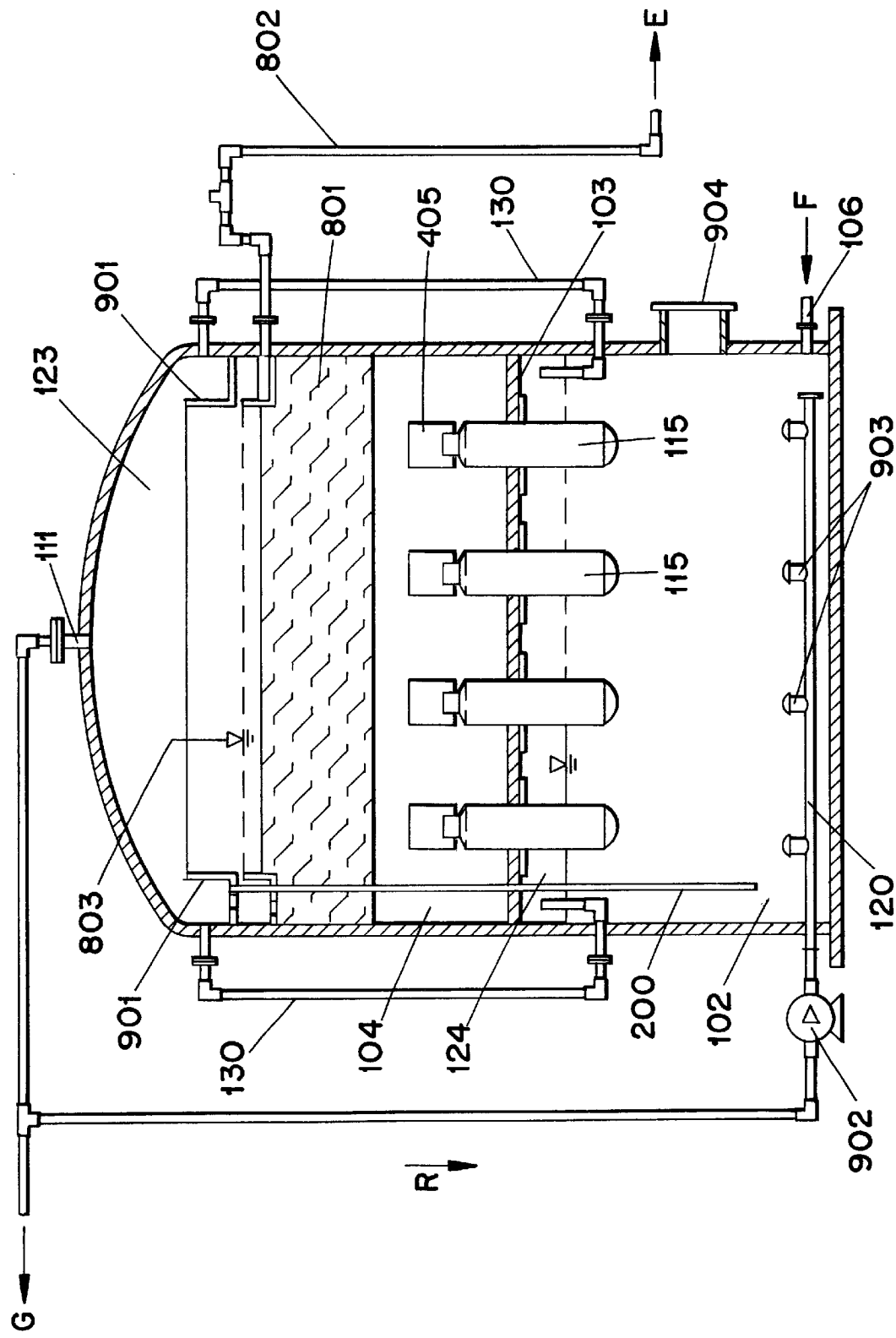
FIG. 9 represents a realization of the invention showing a frill sized anaerobic reactor with multiple modular filter chambers.

FIG. 9 represents a realization of the invention showing a full sized anaerobic reactor with multiple modular filter chambers. Again, all parts which are functionally equivalent to parts in 22 previous figures are identified by same references numbers as in previous figures, and are not explained further. This reactor is a large sized anaerobic reactor with two chambers. The upper chamber 104 is partly filled with biofilm carrier media 801 explained earlier. The upper chamber 104 and lower chamber 102 are separated by an impermeable partition wall 103. Fitted on the partition wall are multiple filter chambers 115, each of which has form identical to that explained in FIG. 4. Automatic gas discharge from gas space 124 of lower chamber is accomplished by multiple U tube type gas conduits 130. The gas conduit tubes are provided external to the reactor, but it may be understood that these tubes can equally well be provided internally within the reactor vessel. The number of gas conduits 130 provided depends on the gas production and circulation rate, keeping in view the necessity of flow in each of the conduits being in the slug flow regime. Each of the gas conduit tubes 130, discharges into a liquid collection launder 901, provided at a sufficient height above the overflow discharge level 804 of liquid in the reactor vessel. A single return tube 200 is connected to collection launder 901. A gas recirculation pump 902 is provided for recirculation of gas from 123 to the lower chamber. The gas sparging system 120 has multiple gas diffusion devices 903 connected to a common gas pressure header pipeline. A large manhole 904, in the lower chamber 102, is provided for maintenance access to the filter chambers. The operation of the reactor follows the description given for device shown in FIG. 8.

Figure 10:
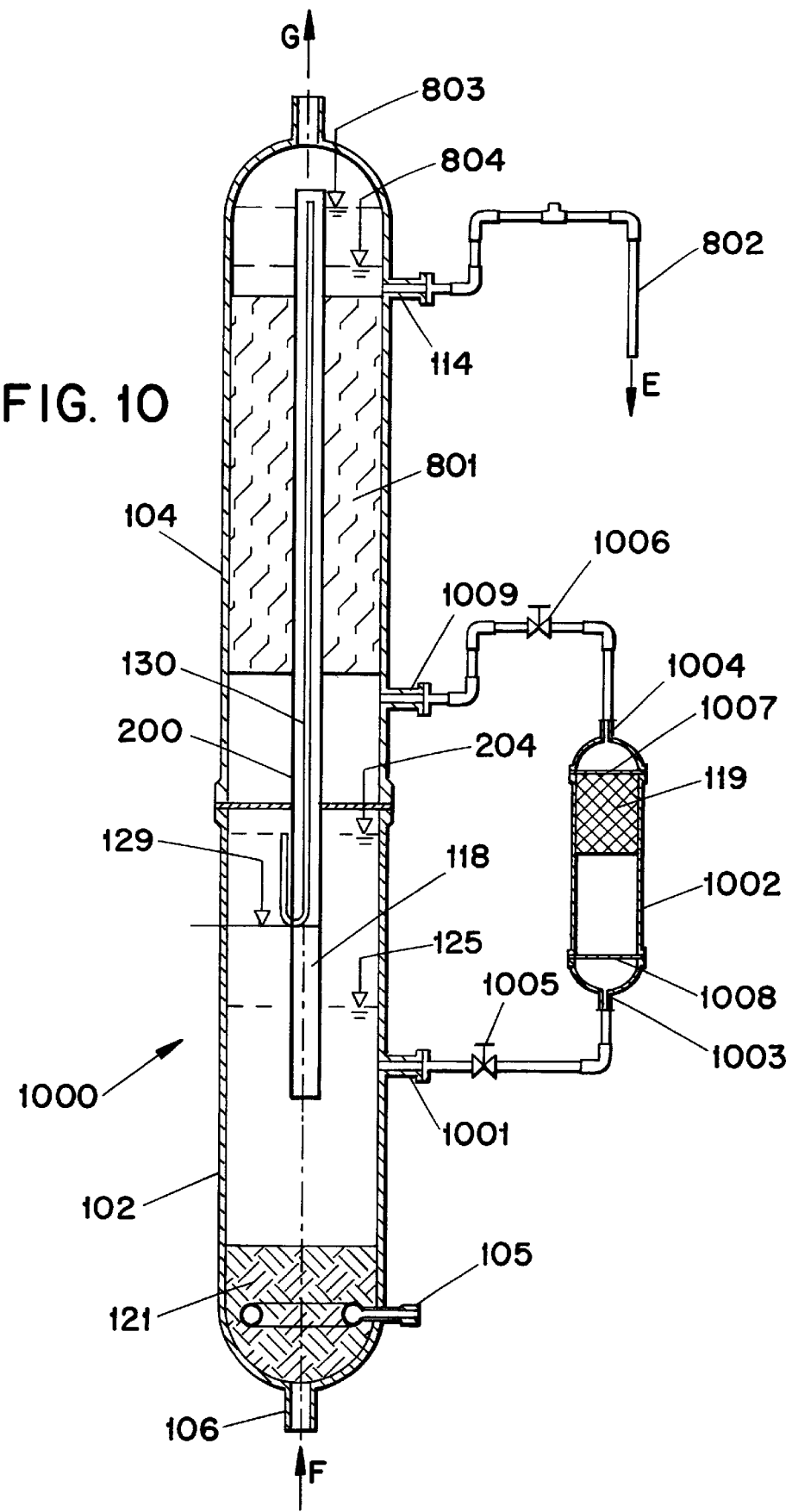
FIG. 10 represents a frilly functional laboratory sized two-chamber anaerobic reactor, with a biofilm upper stage and an external filter chamber.

FIG. 10 represents a fully functional laboratory sized two-chamber anaerobic reactor 1000, with a biofilm upper stage and an external filter chamber. The upper chamber 104 is constructed as a packed bed reactor as described in FIG. 8, and is provided with an additional nozzle 1009. The lower chamber 102 is provided with additional nozzle 1001, at a level below the lowest liquid level 125, in chamber 102. Also provided is an external filter vessel 1002, which is partly filled with a buoyant particulate media 119. Filter vessel 1002 is provided with a bottom nozzle 1003 and fluidly connected to the lower chamber at nozzle 1001 and a top nozzle 1004 fluidly connected with to the upper chamber through nozzle 1009. The filter vessel 1002 is provided with perforated plates 1007 and 1008 at the top and bottom respectively, confining the buoyant particulate bed 119 within the filter vessel 1002. During normal operation, the filter bed 119 is retained against the top perforated plate 1007. During backflush operation, the filter bed is fluidised but retained by the lower perforated plate 1008. Manual shut-off valves 1005 and 1006 are provided on the conduits connecting the external filter vessel with the reactor vessel. Valves 1005 and 1006 may be closed for isolating the external filter vessel 1002 for maintenance of filter. The reactor 1000 is provided with a U tube type gas discharge conduit system as previously described in FIG. 2, which operates between liquid levels 204 (upper) and 125 (lower). The method of functioning is similar to the apparatus described in FIG. 8 and shall not be described further for sake of brevity. The advantage of this configuration is the greater access to the filter chamber for removal, replacement or maintenance of the filter media.

Figure 11A:
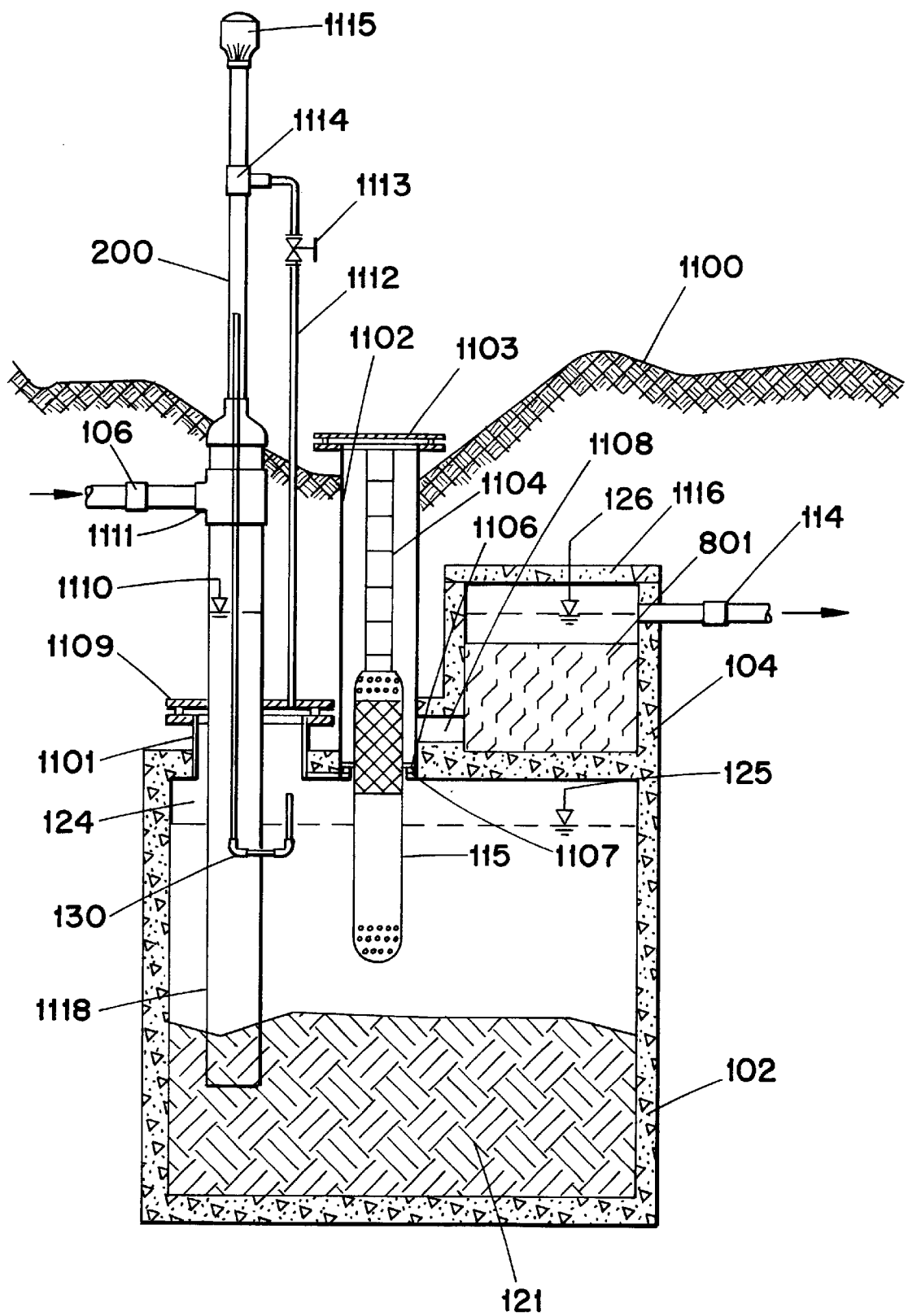
FIG. 11a represents schematically (constructional features which those in the art can readily fill in are omitted for sake of brevity) a preferred embodiment of the buoyant filter bioreactor invention which can be used as a septic tank device for the treatment of household sewage.

FIG. 11a represents schematically (constructional features which those in the art can readily fill in are omitted for sake of brevity) a preferred embodiment of the buoyant filter bioreactor invention which can be used as a septic tank device for the treatment of household sewage. The device is shown under ground level marked as 1100. House sewage connection is provided to port 106 and via tee joint 1111 to the lower chamber 102. A filter access port 1102 from ground level opens into the lower chamber 102. 1102 is provided with gas tight lid 1103. The lid opening is at an elevation above the gravity overflow nozzle 114 of the device so that accessing the filter by opening lid 1103 does not result in overflow of liquid contents. The filter chamber 115 is provided with a long handle 1104 to enable removal of the filter chamber as module for maintenance. The filter chamber is provided with a welded or unitary moulded flange 1105 (refer to FIG. [11-b] 11b for an enlarged view of the filter chamber) and o-ring 1106 to enable leak-tight seating of 115 at the base 1107 of the filter access port 1102, preventing liquid communication between 102 and 1102 except through the filter chamber 115. Also provided for gas discharge from gas space 124 of the lower chamber 102 is a U tube type gas conduit mechanism, 130, with return tube 200, the functioning of which having been described previously in FIG. 2. The return tube is extended upwards to a suitable height for exhaust of the gas without odour nuisance. A hood 1115 is provided for the gas exhaust to prevent entry of debris or rainwater. Alternately, the gas exhaust can be provided with a gas biofilter (not shown) for odour control. Additionally, a gas release tube 1112 with a manually controlled shutoff valve 1113 is provided from the top of the gas space 124. Tube 1112 opens out into the return tube 200 via tee joint 1114 at a height above the gravity overflow 114 from the system, and valve 1112 is accessible from ground level. The inlet port 106 is shown attached to the return tube 200 which is expanded into a sufficiently large diameter tube, called downcomer tube 1118, in the embodiment shown. This arrangement reduces the number of nozzles that require to be cast into the septic tank chamber. It works just as well to provide a separate nozzle directly into lower chamber 102 for input of sewage. The upper chamber, 104, is provided with a biofilm carrier packing 801. Chamber 104 is connected to the filter chamber via conduit 1108. Chamber 104 is provided with a simple non-gas tight lid 1116 that may be removed for maintenance of the packing.

In operation, sewage flows into lower chamber 102, via the downcomer tube, 1110, by gravity. The inlet downcomer tube 1118 contains sewage up to level 1110, which is slightly above the outlet level 126, the difference being the pressure drop across the filter bed. The input sewage contacts preferably with the settled sludge 121 in 102. An equivalent quantity of substantially reacted liquor from 102 is displaced to 104 through the filter 119, as a result of a difference in level between 1117 and 126. Setteable solids are retained in the 102 chamber along with active sludge, 121, where anaerobic reactions result in gas formation. Further degradation of filtered BOD takes place in 104 which is provided with a biofilm retaining packing material 801. The gas produced in 102 accumulates in space 124 and is released through the 130 conduit into the atmosphere periodically when a predetermined level is reached. The gas release process also achieves backflushing of the filter and solids entrapped in the filter fall back into 102 to undergo degradation. The gas produced during sewage anaerobic degradation is low because of the low BOD and COD strength of sewage. It is known that gas production of the order of 0.19 $m^3$/kg-COD-removed, which amounts to a range of 35 to 40 litres of gas per cubic meter of average strength sewage (COD 300 mg/l). The filter backflush volume, being equal to gas production, is about 1 cubic meter per 25 to 28 cubic meters of sewage treated. Gas release tube 1112 is provided for manual release of gas by opening valve 1113 to trigger additional backflushing or for draining of the 104 chamber for maintenance. The filter can also be removed through by opening lid 1102 for maintenance or replacement of filter module if required.

An advantage of this invention is that the effluent is efficiently filtered and free of solids, preventing the final disposal absorption field from clogging.

The major advantage of this invention is that the size of the plant can be made smaller than conventional septic tanks. As sewage BOD is mostly in undissolved form, an efficient filtration system, made of small particle size media, enables the device to be reduced in size, permitting construction as prefabricated units made by plastic moulding. Mass production of the device can lower cost and promote sanitation in developing countries. It is also possible to install this device within the building because of its small size. The device is also suitable for mobile applications.

In community scale operation, the gas produced in the device, can be used as fuel source for such applications as water heating boilers.

Figure 12:
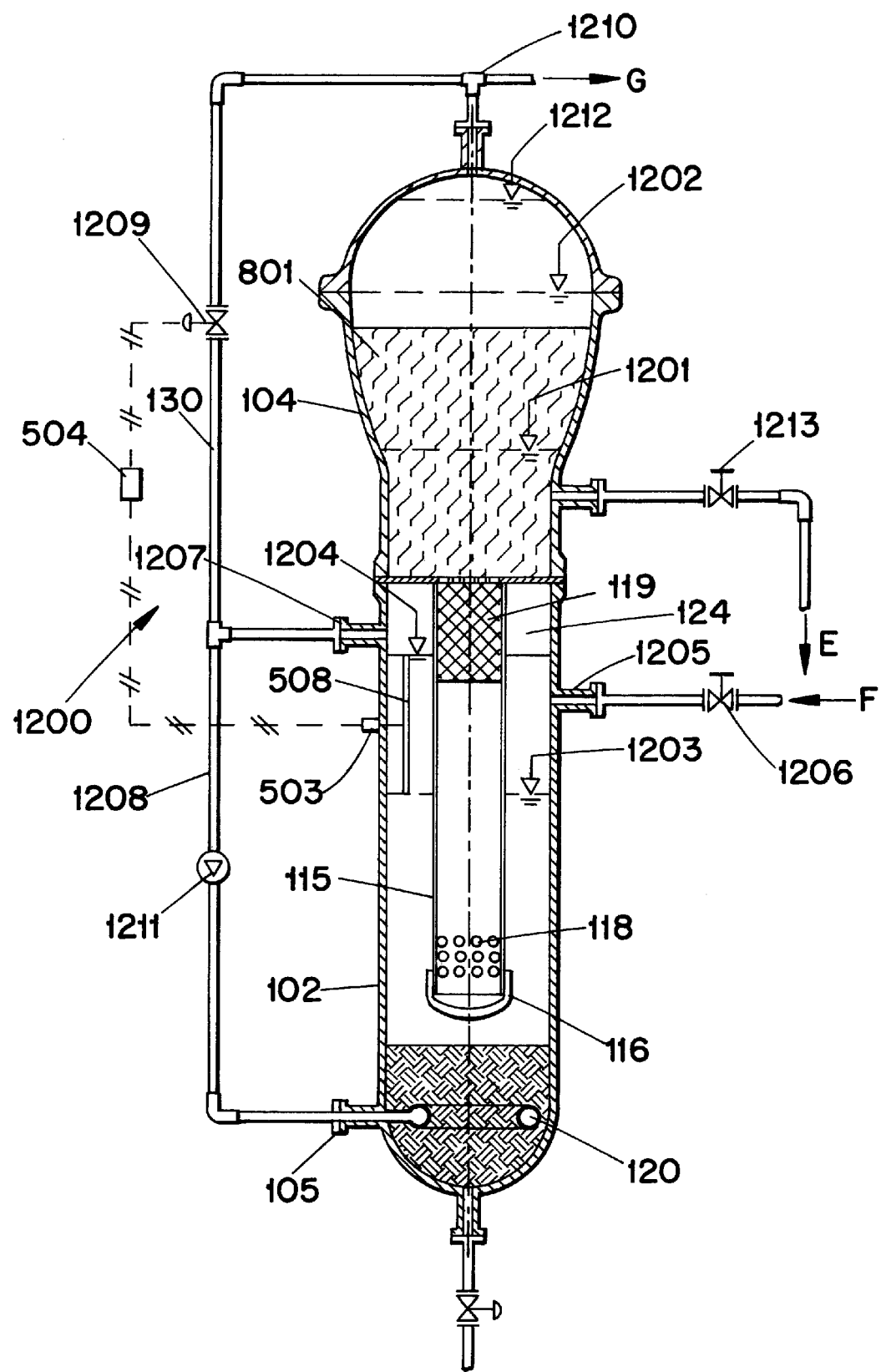
FIG. 12 shows an embodiment of the invention suited for sequencing batch i.e., "fill-react-draw" mode operation.

FIG. 12 shows a realization of the invention which is particularly well suited for sequencing batch i.e., "fill-react-draw" mode operation. Components of same functionality with previous figures have same reference numbers and are not further described for brevity. A two chamber anaerobic reactor with a buoyant filter bed is shown as 1200. It comprises a lower chamber 102 and an upper chamber 104. The upper chamber is constructed as a packed bed with attached biofilm as previously described in FIG. 8. A long filter chamber 115 extending well into the lower half of 102 is provided. A nozzle 1205 and valve 1206 are provided for filling of liquid into the lower chamber and another nozzle 1207 is provided connecting to gas conduit 130 communicating with the upper chamber. A valve 1209 is provided in the gas conduit for closure of gas conduit during react operation. A branch 1208 is provided in the gas conduit 130, before valve 1209 for pumping of gas using a pump, 1211, into the liquor in lower chamber through a sparging device 120. This enables gas mixing of the contents of the reactor. The apparatus is operated as follows: Initially the reactor is filled with reacted liquor to level 1201 in chamber 104 and level 1204 in chamber 102. The liquor contains active and preacclimatised microbial cultures capable of degrading the contaminants in the wastewater to be treated. The level 1204 or indeed any other level in lower chamber 102, can be maintained constant during the liquid charging operation by closing of valve 1209 and valve 1213. The wastewater to be treated is charged (arrow F) into the vessel through nozzle 1205, keeping gas conduit valve 1209 closed and pump 1211 off Some part of the reacted liquor in the chamber 102 is displaced by fresh effluent through the filter 119 into chamber 104. The liquid level in chamber 104 rises to level 1202 at the end of the fill operation. At the end of the fill operation, valve 1206 is closed, valve 1209 is maintained in closed position, and pump 1211 is started, beginning the react operation, wherein mixing is enabled by the gas sparging operation of the pump 1211. The reaction proceeds with gas produced accumulating in space 124, lowering the level 1204. An equivalent volume of liquor is displaced through filter 119 into chamber 102 wherein the liquid level rises to level 1212. As the liquid level in 102 is lowered to level 1203, the gas valve 1209 is opened and gas is released (arrow G) to a constant pressure gas reservoir (not shown). This initiates a backflushing of the filter bed 119. The gas release is stopped by shutting valve 1209 when the liquor level in 102 reaches 1204. This process may be automated by using any of the devices previously described and in the figure the level sensing and valve control devices 508, 504 previously described are shown. The reaction process is continued, if necessary, with several gas release and backflushing operations, until gas production rate is substantially reduced, indicating the end of the reaction. At the end of the reaction, the treated liquor is drawn, (arrow E), from chamber 104 by opening valve 1213. The process of filling, reacting and drawing may be repeated with a fresh batch of wastewater. It may be understood that this method of operation can equally be applied to apparatus with multiple filtration stages.

It may also be noted that short circuiting of feed through the filter bed is avoided by the positioning of nozzle 1205 at an elevation well above the level of the inlet perforations 118 of filter chamber 119. In any case, even if part of the feed circuits through the filter bed into 104 during the feed operation, this does not affect the efficiency of the process materially, as reactions can proceed in the 104 chamber also. Further, during backflushing operations which may take place several times during the react phase depending on the strength of the wastewater, liquid in chamber 104 gets returned to chamber 102.

Figure 11B:
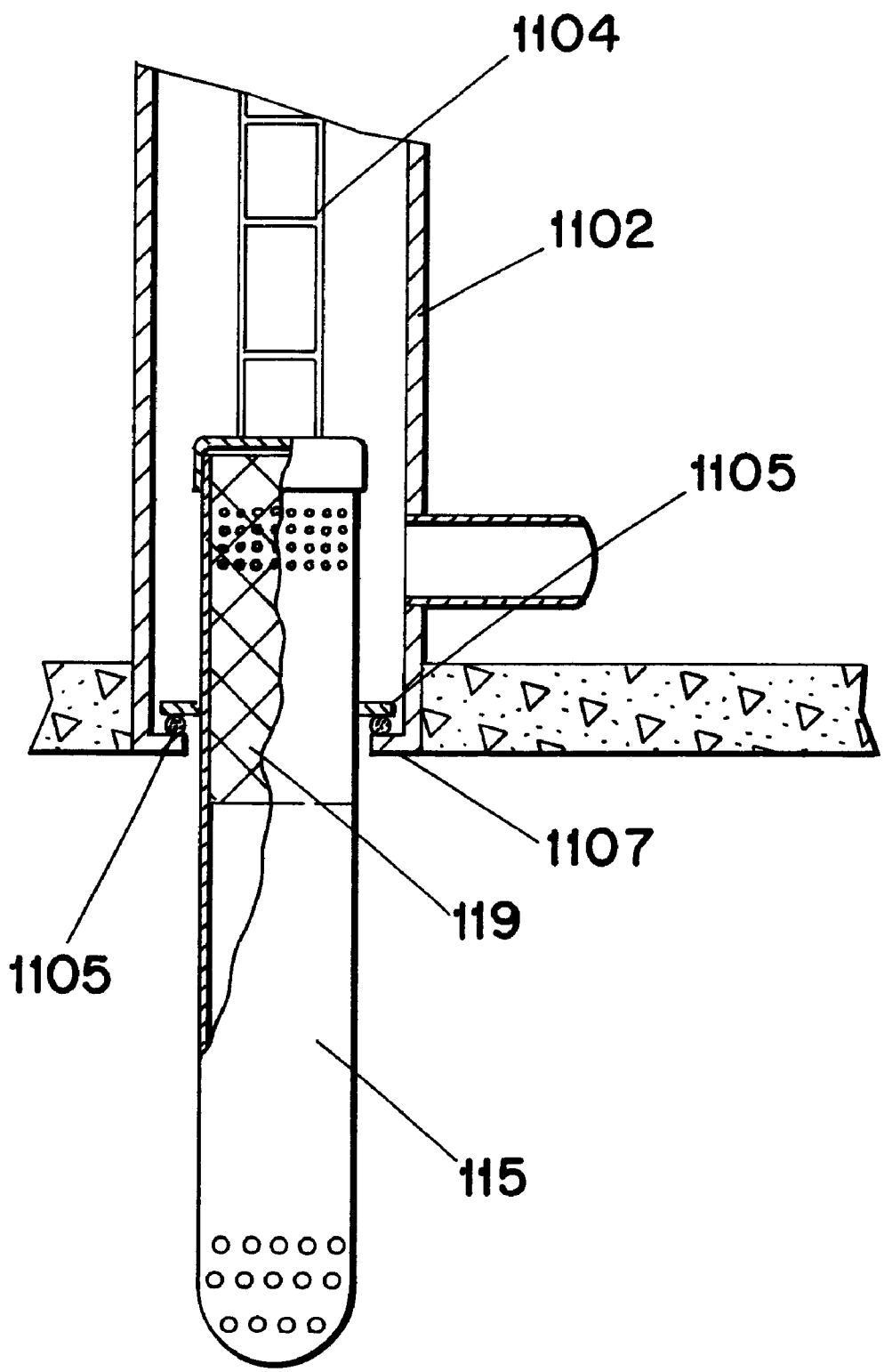
FIG. 11b is an enlarged view of the filter chamber.
Figure 13:
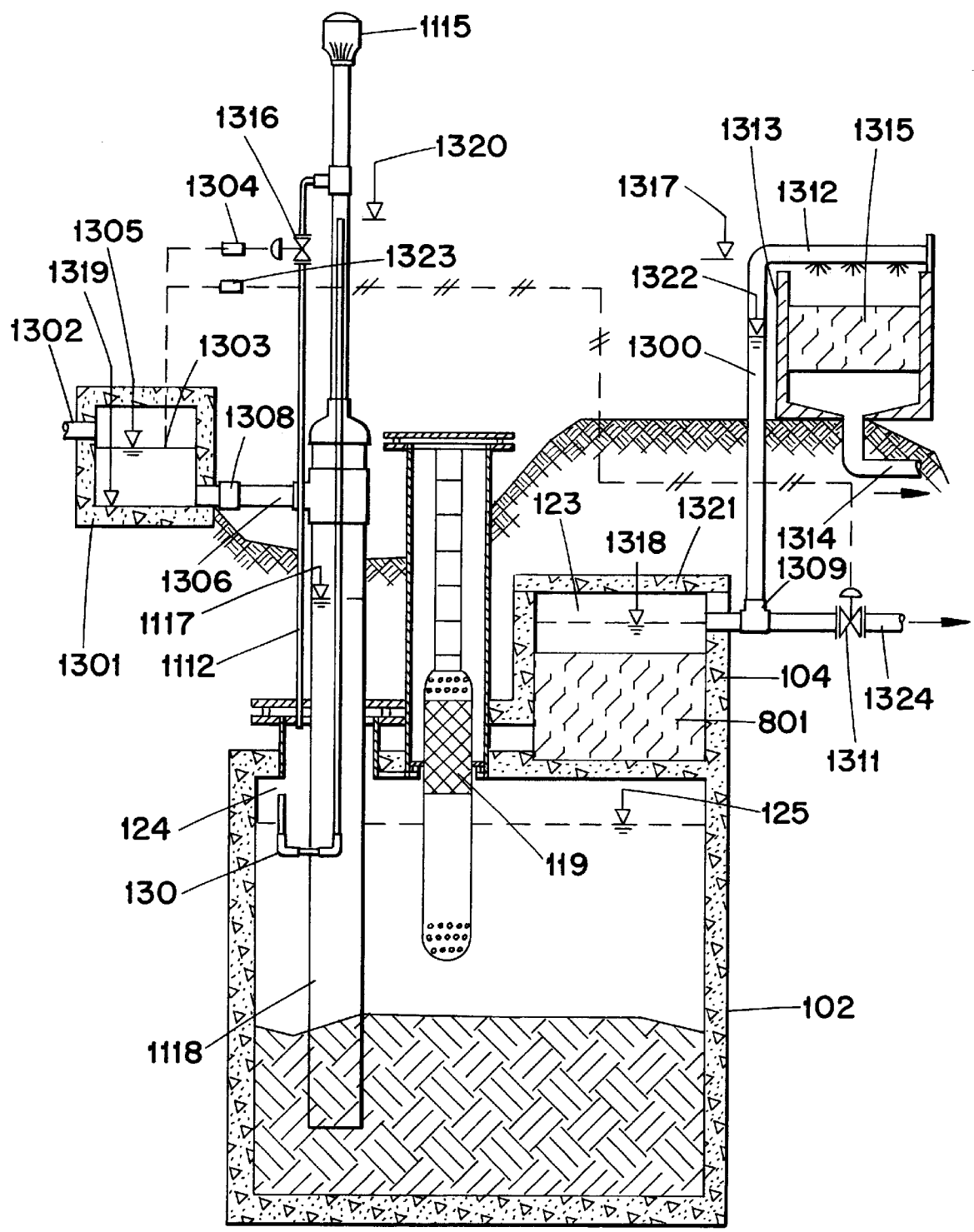
FIG. 13 shows a realization of the invention for unpowered gravity flow operation, suitable for anaerobic-aerobic treatment of black water sewage or high strength wastewater with such components as ground kitchen waste and animal waste.

FIG. 13 shows a realization of the invention for unpowered gravity flow operation, suitable for anaerobic-aerobic treatment of black water sewage or high strength wastewater with such components as ground kitchen waste and animal waste. The system is designed to provide both anaerobic and aerobic treatment by self-pumping of anaerobic treated effluent to an aboveground-air contact aerobic treatment stage. It works with complex wastewater whose gas production potential is larger than its liquid volume. Such a situation is possible when the waste contains degradable COD in excess of 2500 mg/l. In the figure, tank 1301 is a collection tank provided with a nozzle 1302 connected to sewage line from toilets. Tank 1301 is provided with a outlet conduit 1306 connecting to the treatment unit. A one-way valve 1308 is provided on the line 1307 connecting tank 1301 with the lower chamber of the treatment unit 102. The basic treatment unit is a two chamber buoyant filter bed reactor as described previously in FIG. 11. A removable filter and filter chamber as previously described is provided for ease of maintenance. At least part of upper chamber 104 is below the lowest level 1319 of the collection tank. The upper chamber 104, unlike in the apparatus of FIG. 11, is provided with a gas tight lid, 1321. The apparatus shown is not provided with a gas storage and utilization system. Needless to add, a gas collection system may be installed, where required, without difficulty. Liquid knockout and return tube 200 is continued vertically to terminate in a gas exhaust hood 1115 at a suitable elevation to eliminate odour nuisance as previously described. An additional gas release tube 1112 with an automatic shut off valve 1316 for release of gas from gas space 124 is provided. The tube 1112 opens out into the liquid knockout and return tube 200 at a suitable elevation, 1320, above the highest liquid level in the system, i.e., 1317. The upper chamber 104 is provided with liquid outlet 1399 at its top. The liquid outlet rises vertically and discharges through a perforated distributor 1312 into a air contact tank 1313 filled with packing media 1315 for the growth of aerobic micro-organisms. The tank 1313 is provided with a outlet 1314 at its bottom for discharge of aerobic treated water safely.

In operation, wastes such as black water sewage from toilets is discharged into the collection tank 1301. The level of liquid in 104 is kept sufficiently lower than the bottom level, 1319, of tank 1301. In this condition, one-way-valve 1308 opens and permits the flow of waste into 102, by gravity. Tank 1302 is constructed with its floor being above the full or overflow level of chamber 104 (shown as 1318), so that it can be entirely emptied by gravity. When 1301 empties, and the conduit 1307 is empty, one-way valve 1308 is arranged to close. A swing type valve is appropriate as one-way valve 1308, as it is in normally closed condition when the conduit is empty. In tank 102, an active population of anaerobic bacteria starts the degradation reactions leading to gas production. Gas is collected in space 124 of chamber 102 and liquor is displaced into 104 through filter 119. The gas discharge mechanism is positioned so that before each gas discharge takes place, sufficient liquid, at least equal to the capacity of the collection tank, 1301, is displaced into upper chamber 104, and liquid is forced out into the rising outflow conduit 1300, where level 1322 rises above bottom level, 1319, of tank 1301, ultimately flowing out through 1312 into the packed bed 1312.

Here aerobic microorganisms continue the process of degradation through secondary treatment, leading to a high degree of removal of BOD. Liquid back flow from lower chamber 102 into the collection tank 1301 is prevented by the one way valve 1308. When sufficient quantity of gas has accumulated, it is discharge through the operation of the U tube mechanism previously described. At this stage, filter 119 is backflushed and the liquid level 1322 is lowered and gravity flow of liquid through one way valve 1308 is possible if liquid is present in 1302. If there is no liquid in 1302, and the gas production rate in 102 is still continuing at an effective rate, a secondary cycle is repeated with gas accumulation in 124, liquid displacement through filter into 104, till final gas discharge and back wash of filter. But during this secondary cycle, there will not be any overflow of liquid through 1312. Now, it is possible that gas accumulation has ceased with a certain amount of gas accumulated in space 124 and level 1322 is above the level 1319, while influent sewage has accumulated in 1302, to a predetermined level 1305. At this stage valve, level operated mechanism 1303, 1304, is activated and valve, 1316, in additional gas discharged tube 1112, is opened automatically, and gas is released from the system. The liquid level 1318 is thus brought to its initial state below 1319, immediately allowing input of sewage from 1302, and emptying tank 1301.

It is required to have a COD in excess of 2500 mg/l if sufficient gas production volume is to be generated to enable displacement pumping against gravity. This mode of operation is therefore suitable for strong wastes such as blackwater and ground food waste discharges. However, it is possible that there are occasional unavoidable discharges of lower strength wastes into the system, and sufficient gas production is, therefore, not available to enable displacement pumping of liquid through 1312. In this case, hydraulic levels 1322 will equal the level of liquid 1305 inside the collection tank 1301. There will be no emptying of tank 1301, even when the valve 1316 is opened. In such instances, a gravity flow option, through a conduit 1324 connected to the conduit 1300 via a tee joint 1309 is provided to enable the operation of this device in a manner similar to device described in FIG. 11. An outflow valve 1311 is 28 provided in this conduit, which when open, enables the discharge of the upper chamber liquor by gravity. Outflow valve 1311 is activated by a timer mechanism 1323, connected to the level sensing device 1303. The timer activates the opening of valve 1311 if tank 1301 is not emptied within a predetermined short time interval after opening of valve 1316, i.e., if the level sensor 1303 continues to detect the presence of liquid level 1305, even after a set time interval after opening of valve 1316. When valve 1311 is open, for low strength wastes, the device does not provide pumping into for above-ground-air-contact treatment, but merely discharges anaerobic treated effluent from the upper chamber 104. Once valve 1311 is open, collection chamber 1301 is emptied, and the one-way valve 1308 as well as valve 1311 closes. In case sufficient gas production takes place with the fresh input of waste, the cycle of operation with liquid discharge through outlet 1312 as previously described takes place. Otherwise, wastewater flowing into collection chamber 1301 simply flows by gravity into the lower chamber, 102, displacing an equal quantity through the filter 119 into the upper chamber 104. As valve 1311 is in closed position, liquid accumulates in 104 and level 1322 rises in the conduit 1300 along with corresponding level 1117 in the downcomer tube 1118. When 1117 rises above at the level of conduit 1306, no further flow of wastewater from the collection tank 1301 is possible, and an accumulation of wastes takes place in 1301 until it reaches the trigger level of sensor 1303. At all times during this process, a slow gas accumulation takes place in 124, as a result of anaerobic degradation. The quantity of gas may not be sufficient to trigger self-release through the 130 U tube mechanism. However, whatever gas has accumulated in 124 is released by the operation of automatic valve 1316. During each such gas release, backflushing of the filter takes place and simultaneously further wastes flow into the downcorner 1118, till level 1117 rises to equal level of liquid in 1301. As there is no outflow from the system, wastes will accumulate in 1301. The triggering of valve 1316 initiates gas release and backflushing of filter, but liquid flow into the reactor is no longer possible. Under this condition, the timer device activates opening of valve 1311 for a predetermined duration and outflow by gravity takes place from 104 emptying collection tank 1301. The valve 1311 closes after tank 1301 is emptied. This cycle is repeated as long as gas production is insufficient to create outflow through the 1312 outlet. As soon as gas production at a sufficient rate commences, pumped discharge of liquid through the 1312 outlet takes place and no outflow through the 1324 outlet takes place. Depending on gas production potential of the wastes, the system may also operate with discharge through the 1312 outlet and discharge through the 1324 outlet alternately.

It may also be noted that any gas accumulation in space 123 of upper chamber 104 is discharged through either liquid outlet 1312 or 1324, whichever is open.

I claim:

1. A device for the biological treatment of wastewater containing biodegradable solids comprising a vertically oriented elongated vessel partitioned, in vertical progression, by impermeable substantially horizontal walls into a top chamber and a bottom chamber, each chamber being provided with a gas retention space and a liquid retention space, each pair of neighboring chambers defining a lower chamber and an upper chamber, a nozzle establishing fluid communication between the bottom chamber and the outside of the vessel for input of wastewater into the vessel; a nozzle establishing fluid communication between the liquid retention space of the top chamber with the outside of the vessel for discharge of treated wastewater from the vessel, and arranged so as to retain a level of liquid within the top chamber; a nozzle for discharge of gas from the gas retention space of the top chamber; further comprising for every pair of neighboring chambers, at least one filter chamber having at least one inlet communicating fluidly with a liquid retaining part in the lower chamber and at least one outlet communicating fluidly with the liquid retaining part of the upper chamber; a filter bed placed within said at least one filter chamber, and partly filling the internal volume of the at least one filter chamber; at least one gas conduit establishing fluid communication between a gas retaining space in the lower chamber with a gas retaining space of the upper chamber; and a discharge means enabling periodic discharge and stoppage of flow of gas through said at least one gas conduit.

2. A device as claimed in claim 1, wherein the at least one filter chamber is oriented with its axis vertical and contained within the vessel.

3. A device as claimed in claim 1, wherein a multiplicity of intermediate chambers one below the other are provided between the top chamber and bottom chamber.

4. A device as claimed in claim 2, wherein the at least one filter chamber is contained within the upper and lower chambers and establishes fluid communication therebetween and arranged so as to penetrate said partition wall between these upper and lower chambers.

5. A device as claimed in claim 1, wherein the at least one filter chamber is provided with porous plugs, at both thereof ends, able to retain said filter bed within the respective filter chamber, while permitting free flow of fluid.

6. A device as claimed in claim 1, wherein for each neighboring pair of chambers, said at least one gas conduit communicates fluidly between the gas space of the lower chamber and the gas space of the upper chamber.

7. A device as claimed in claim 1, wherein further comprising for each pair of neighboring chambers a valve device in said at least one gas conduit between the lower chamber and upper chamber, a means for sensing the liquid level in the lower chamber and activating the valve device for starting, stopping and controlling the gas flow through the gas conduit.

8. A device as claimed in claim 1, wherein said at least one gas conduit further comprises a descending leg in the lower chamber through which gas flow is downward, an ascending leg through which gas flow is upward, the gas conduit inlet in the lower chamber being located above the level of the fluid inlet to the said filter chamber between that chamber and the chamber immediately above, the gas conduit outlet in upper chamber being located above the liquid surface in the upper chamber.

9. A device as claimed in claim 1, wherein each pair of neighboring chambers is further provided with a liquid return conduit connecting the liquid retaining space of the lower chamber with the gas retaining space of the upper chamber, the at least one gas conduit comprising an outlet in the upper chamber opening into the liquid return conduit.

10. A device as claimed in claim 1, further comprising at least one nozzle for gas injection into at least one lower chamber, a conduit for circulation of gas from a gas retention space of any of the upper and lower chambers to said nozzle for gas injection.

11. A device as claimed in claim 1, further comprising a cover or a baffle for deflecting rising bubbles away from the inlet to said filter chamber.

12. A device as claimed in claim 1, further comprising: means for directing the flow of fluid emanating from the filter chamber toward the lower part of the upper chamber.

13. A device as claimed in claim 1, further comprising an inverted generally frustoconical baffle for directing the flow of fluid emanating from the filter chamber toward the lower part of the upper chamber.

14. A device as claimed in claim 1, further comprising, for every pair of neighboring chambers, an extension of the said filter chamber in the upper chamber well above the region occupied by sludge in the upper chamber, outlet perforations being provided on the said extension of the filter chamber, said extension of filter chamber being of smaller diameter than the main body of the filter chamber, a cylindrical tube baffle provided to deflect rising bubbles away from the outlet of the filter chamber and induce a circulatory flow in liquid contents of the upper chamber which is downward directed in the vicinity of the outlet perforations of filter chamber.

15. A device as claimed in claim 1, wherein said at least one gas conduit has an internal diameter between 5 mm and 25 mm for at least part of a length thereof.

16. A device as claimed in claim 1, wherein the said gas retention space in said lower chamber is a substantial part of the volume of the lower chamber.

17. A device as claimed in claim 1, wherein the at least one of the said chambers contains a packing media suitable for biofilm formation.

18. A device as claimed in claim 1, wherein the said top chamber contains a packing media suitable for biofilm formation.

19. A device as claimed in claim 1, further comprising a gassoid-separator means fixed to the top chamber to enable disengagement of gas, settling of sludge and overflow of clarified liquor from the vessel.

20. A device as claimed in claim 1, wherein the gas retention space in the said top chamber is provided by a floating gas holder.

21. A device as claimed in claim 1, further comprising a means for mixing the contents of the chambers.

22. A device as claimed in claim 1, further comprising a means for mixing the contents of the lower chamber by gas circulation.

23. A device as claimed in claim 1, wherein the said device has more than one pair of neighboring chambers, with buoyant bed filters between neighboring chambers establishing liquid communication therebetween, said buoyant filter beds comprising particulate media graded to size so liquid input into the bottom chamber is filtered through filter beds of progressively finer sized particles at each successive chamber, before exiting the vessel.

24. A device as claimed in claim 1, further comprising a non-return valve connected to the inlet nozzle to prevent return a flow of vessel contents through the nozzle.

25. A device as claimed in claim 1, wherein said gas conduit is further provided with a liquid knock-out and a return conduit for knocking out the liquid and gas flowing through the gas conduit, said knockout and said return conduit provided with a liquid seal and a liquid outlet for conducting the knockout liquid to a wastewater feed sump or back to the lower chamber.

26. A device as claimed in claim 1, further comprising a collection launder positioned in the gas phase of the upper chamber to collect liquid discharges from said gas conduit, said collection launder fluidly connected at all time to liquid in the lower chamber.

27. A method for the biological treatment of wastewater containing biodegradable solids in a device as claimed in claim 1, comprising continuously flowing the wastewater into a lower chamber, thereby resulting in the sedimentation of settleable solids in a lower chamber, liquefying solids and forming soluble COD in the lower chamber by the action of microorganisms retained in the bottom chamber, the presence of anaerobic microorganism in the lower chamber resulting in the formation of gas in the lower chamber, forming methane from soluble and colloidal COD in the lower chamber by the action of anaerobic micro-organisms, collecting gas in a head space of the lower chamber, consequently displacing liquid from the lower chamber, passing liquor from the lower chamber through a buoyant granular filter bed, wherein at least part of the suspended solids and microbial sludge are separated from the liquor, collecting the filtered liquor in an upper chamber, periodically releasing collected gas from the lower chamber, and consequently enabling the backflow of liquor from the upper chamber to the lower chamber, allowing the inverse fluidization of the granular filter bed and backflushing of the retained solids in the granular filter bed into the lower chamber, further liquefying back flushed solids and formation of soluble COD in the lower chamber by the action of micro-organisms, if desired any of the above steps in additional units having sequences of lower chamber, buoyant filter bed and upper chamber, till the liquor is substantially free of solid and dissolved biodegradable contaminants, removing liquor from the upper chamber, separating microbial sludge from the liquor and passing the sludge back into the upper chamber, removing the clarified liquor, which is now treated to have substantially lower amounts of biodegradable contaminants.

28. A method as claimed in claim 27 comprising feeding a quantity of the wastewater into the device, discontinuing the feeding of wastewater into the device when it has reached a predetermined full level, sedimenting the settleable solids in the said lower chamber, maintaining conditions of temperature, pH and mixing for the liquefaction of solids and formation of soluble COD in the lower chamber by the action of micro-organisms, forming gas in said lower chamber by the action of anaerobic microorganisms, collecting the gas in the gas retention space of the lower chamber, displacing the liquor in lower chamber to an upper chamber at a higher elevation, through a buoyant granular filter bed, by the collection of gas in the gas retention space of the lower chamber, clarifying the liquor passing through the buoyant granular filter bed by the filtering action to retain suspended solids and microbial sludge in the filter bed, further producing methane from soluble and colloidal COD in the upper chamber by the action of anaerobic microorganisms, removing gas produced in the upper chamber, separating and settling the microbial sludge from the liquor in the upper chamber, releasing at least part of the gas collected in the lower chamber gas retention space by operating the said device for stoppage and discharge of gas at suitable intervals, allowing backflow of at least part of the liquor from the upper chamber to the lower chamber, thereby permitting the inverse fluidization of the buoyant granular filter bed and backflushing of the retained solids in the granular filter bed into the lower chamber, further liquefying of backflushed solids and formation of soluble COD in the lower chamber by the action of microorganisms, continuing, if necessary, the steps of gas production, gas collection, displacement of liquor, filtering, gas release and backflushing, till the wastewater is substantially free of biodegradable contaminants, removing part of the clarified and treated liquor from the upper chamber, the volume so removed being not greater than the volume of wastewater initially fed to the vessel, filling the vessel with a fresh quantity of wastewater and repeating all the above steps.

29. A device for the treatment of sewage comprising a vessel partitioned into a upper chamber and a lower chamber, said lower chamber having a gas retaining space and a liquid retaining space, a feed conduit and nozzle permitting flow of sewage into said lower chamber by gravity, the upper chamber having a liquid retaining space and at least part of its liquid retaining volume at an elevation above the said lower chamber, at least one buoyant bed filter, in a suitable housing, removable from the vessel without spillage of the contents of the vessel, fluid communication between the lower chamber and the upper chamber being restricted to liquid communication between the liquid retaining space in the lower chamber and the upper chamber exclusively through the buoyant bed filter, a return conduit extending vertically from the lower chamber to the outside terminating at a elevation well above the highest level of fluid in the device, and being of sufficient extent at its lower end to form a liquid seal in liquid contents of the lower chamber, a automatic gas release conduit, having a substantially vertical descending leg and an ascending leg, the ascending leg opening at its upper end into the return conduit at an elevation above the highest level of liquid in the device, the descending leg opening into the lower chamber at a suitable elevation, the gas release conduit assembly being oriented so that the direction of fluid flow entering from the lower chamber being downwards in the descending leg and upwards in the ascending leg, a secondary gas release conduit extending vertically from the gas retaining portion of the lower chamber and opening into the return conduit at an elevation well above the highest level of liquid in the device, a valve device to enable gas tight shutoff and opening of the secondary gas release conduit, and an outlet nozzle in said upper chamber for the output of treated wastewater.

30. A device as claimed in claim 29 wherein the said buoyant filter in a suitable housing comprises at least one filter installation chamber extending vertically from the lower chamber to the outside of the vessel at an elevation above the highest liquid level in the device, a gas tight lid for the filter installation chamber, a conduit establishing fluid communication between the said filter installation chamber and the upper chamber, at least one filter module, having a elongated housing partly filled with a buoyant particulate media, the housing having perforations at both its ends, allowing the flow of fluid through the module but retaining the buoyant particulate media, at least one filter module installed vertically in the filter installation chamber, with a fluid impermeable seal preventing fluid communication between the filter installation chamber and the lower chamber except through the filter module, the filter module being of sufficient length so that perforations at its lower end are at all times immersed in liquid retaining part of lower chamber, forming a liquid seal preventing entry of gas from the gas retaining space while liquid communication is established from the lower chamber to the upper chamber through the filter module.

31. A device for the treatment of sewage comprising a collection tank for collecting by gravity flow sewage and wastes, a nozzle in the collection tank for discharge of wastes, a level sensing device in the collection tank, a conduit connecting the collection tank to a lower chamber, at an elevation below the floor of the collection tank, said lower chamber having a gas retaining space and a liquid retaining space, a feed conduit permitting flow of sewage into the said lower chamber by gravity, a one-way valve in the feed conduit, preventing the back flow of liquid from the lower chamber to the collection tank, an upper chamber having a liquid retaining space and a gas retaining space, and having at least part of its liquid retaining volume at an elevation above the said lower chamber, at least one filter installation chamber extending vertically from the lower chamber to the outside at an elevation above the highest liquid level in the device, a gas tight lid for the filter installation chamber, a conduit establishing fluid communication between the said filter installation chamber and the upper chamber, at least one filter module having a elongated housing partly filled with a buoyant particulate media, the housing having perforations at both its ends, allowing the flow of fluid through the module but retaining the buoyant particulate media, at least one filter module installed vertically in the filter installation chamber, with a fluid impermeable seal preventing fluid communication between the filter installation chamber and the lower chamber except through the filter module, the filter module being of sufficient length so that perforations at its lower end are at all times immersed in a liquid retaining part of lower chamber, forming a liquid seal preventing entry of gas from the gas retaining space while liquid communication is established from the lower chamber to the upper chamber through the filter module, a return conduit extending vertically from the lower chamber to the outside terminating an elevation well above the highest level of fluid in the device, and being of sufficient extent at its lower end to a form liquid seal in liquid contents of the lower chamber, an automatic gas release conduit, having a substantially vertical descending leg and an ascending leg, the ascending leg opening at its upper end into the return conduit at an elevation above the highest level of liquid in the device, the descending leg opening into the lower chamber at a suitable elevation, the gas release conduit assembly being oriented so that the direction of fluid flow entering from the lower chamber being downwards in the descending leg and upwards in the ascending leg, a secondary gas release conduit extending vertically from the gas retaining portion of the lower chamber and opening into the return conduit at an elevation well above the highest level of liquid in the device, an automatic valve device to enable gas tight shutoff and opening of the secondary gas release conduit, when receiving a signal from the level sensing device in the collection tank, a tank at an elevation above the collection tank containing material with aerobic biofilm, a primary outlet conduit for conveying and discharging contents from the upper chamber to the tank containing aerobic biofilm, a secondary outlet conduit at a level below the floor of the collection tank for gravity overflow discharge of liquor from the secondary chamber, a automatic valve device in the secondary outlet conduit that can be operated by a remote signal, a timer device capable of activating the said automatic valve device in the secondary outlet conduit when the collection tank contains more than a predetermined quantity of waste for a predetermined length of time.

32. A device for the biological treatment of wastewater containing biodegradable solids comprising: a vertically oriented elongated vessel partitioned by an impermeable substantially horizontal wall into a top chamber and a bottom chamber, each chamber being provided with a gas retention space and a liquid retention space: a nozzle establishing fluid communication between the bottom chamber and the outside of the vessel for input of wastewater into the vessel; a nozzle establishing fluid communication between the liquid retention space of the top chamber with the outside of the vessel for discharge of treated wastewater from the vessel, and arranged so as to retain a level of liquid within the top chamber; a nozzle for discharge of gas from the gas retention space of the top chamber; at least one filter chamber having at least one inlet communicating fluidly with the liquid retaining space in the bottom chamber, and at least one outlet communicating fluidly with the liquid retaining space of the top chamber; a filter bed placed within the at least one filter chamber and partly filling an internal volume of the at least one fluid chamber; at least one gas conduit establishing fluid communication between the gas retention space in the lower chamber with the gas retention space in the upper chamber; and a discharge means enabling periodic discharge and stoppage of flow of gas through the at least one gas conduit.

* * * * *